(12) United States Patent
Morgan et al.

(10) Patent No.: US 12,435,312 B2
(45) Date of Patent: Oct. 7, 2025

(54) QUANTIFYING CELL-DERIVED CHANGES IN COLLAGEN SYNTHESIS, ALIGNMENT, AND MECHANICS IN A 3D CONNECTIVE TISSUE MODEL

(71) Applicant: Brown University, Providence, RI (US)

(72) Inventors: Jeffrey R. Morgan, Sharon, MA (US); Benjamin T. Wilks, Boston, MA (US)

(73) Assignee: Brown University, Providence, RI (US)

( * ) Notice: Subject to any disclaimer, the term of this patent is extended or adjusted under 35 U.S.C. 154(b) by 286 days.

(21) Appl. No.: 18/175,417

(22) Filed: Feb. 27, 2023

(65) Prior Publication Data

US 2023/0279356 A1 Sep. 7, 2023

Related U.S. Application Data

(60) Provisional application No. 63/314,815, filed on Feb. 28, 2022.

(51) Int. Cl.
*C12N 5/077* (2010.01)

(52) U.S. Cl.
CPC ........ *C12N 5/0656* (2013.01); *C12N 2501/15* (2013.01); *C12N 2501/727* (2013.01); *C12N 2503/02* (2013.01); *C12N 2513/00* (2013.01); *C12N 2527/00* (2013.01); *C12N 2533/76* (2013.01)

(58) Field of Classification Search
None
See application file for complete search history.

(56) References Cited

U.S. PATENT DOCUMENTS

| | | |
|---|---|---|
| 5,032,508 A | 7/1991 | Naughton et al. |
| 5,536,656 A | 7/1996 | Kemp et al. |
| 5,863,531 A | 1/1999 | Naughton et al. |
| 5,902,741 A | 5/1999 | Purchio et al. |
| 5,928,945 A | 7/1999 | Seliktar et al. |
| 6,974,679 B2 | 12/2005 | Andre et al. |
| 7,553,664 B2 | 6/2009 | Noll et al. |
| 7,622,298 B2 | 11/2009 | Neumann |
| 8,013,121 B2 | 9/2011 | Xiong et al. |
| 8,043,614 B2 | 10/2011 | Ahlfors |

(Continued)

FOREIGN PATENT DOCUMENTS

| | | |
|---|---|---|
| CN | 102091352 A | 6/2011 |
| CN | 109251887 A | 1/2019 |

(Continued)

OTHER PUBLICATIONS

Schell , et al., "Harnessing Cellular-Derived Forces in Self-Assembled Microtissues to Control the Synthesis and Alignment of ECM", Elsevier, 2015, 32 pages.

(Continued)

*Primary Examiner* — David W Berke-Schlessel
(74) *Attorney, Agent, or Firm* — Banner & Witcoff, Ltd.

(57) ABSTRACT

Described herein are in vitro quantitative methods directed to 3D extracellular matrix (ECM) organization and mechanics. The methods do not require application of an external force, anchorage, or a scaffolding material in order to culture ECM tissue constructs, and the methods enable quantitative measurements without crosstalk noise from variables attributable to external forces, anchorage, and scaffolding material.

19 Claims, 33 Drawing Sheets

(56) References Cited

U.S. PATENT DOCUMENTS

| | | | |
|---|---|---|---|
| 8,414,928 | B2 | 4/2013 | Dodge |
| 9,034,571 | B2 | 5/2015 | Berry et al. |
| 9,243,278 | B2 * | 1/2016 | Morgan ................ C12Q 1/025 |
| 9,297,005 | B2 | 3/2016 | Huebsch et al. |
| 9,303,245 | B2 | 4/2016 | Rivron et al. |
| 9,617,511 | B2 | 4/2017 | Chen |
| 9,753,023 | B2 | 9/2017 | Nain et al. |
| 9,771,554 | B2 | 9/2017 | Morgan et al. |
| 10,254,274 | B2 | 4/2019 | Miklas et al. |
| 10,961,496 | B2 | 3/2021 | Levner et al. |
| 11,180,728 | B2 | 11/2021 | Klaka et al. |
| 11,191,789 | B2 | 12/2021 | Kihm et al. |
| 11,286,451 | B2 | 3/2022 | Morgan et al. |
| 2003/0003089 | A1 | 1/2003 | Akins |
| 2003/0166274 | A1 | 9/2003 | Hewitt et al. |
| 2004/0023907 | A1 | 2/2004 | Dieterich et al. |
| 2004/0063206 | A1 | 4/2004 | Rowley et al. |
| 2004/0096815 | A1 | 5/2004 | Perrier et al. |
| 2004/0126405 | A1 | 7/2004 | Sahatjian et al. |
| 2004/0147016 | A1 | 7/2004 | Rowley et al. |
| 2005/0008623 | A1 | 1/2005 | Bechetoille et al. |
| 2008/0281434 | A1 | 11/2008 | Schmidt et al. |
| 2013/0101635 | A1 | 4/2013 | Park et al. |
| 2013/0164339 | A1 | 6/2013 | Murphy et al. |
| 2013/0190210 | A1 | 7/2013 | Murphy et al. |
| 2016/0326477 | A1 | 11/2016 | Fernandez-Alcon et al. |
| 2017/0029778 | A1 | 2/2017 | Peterson et al. |
| 2018/0361025 | A1 | 12/2018 | Lancaster et al. |
| 2020/0347359 | A1 | 11/2020 | Magin et al. |
| 2022/0220450 | A1 | 7/2022 | Spector et al. |
| 2022/0296783 | A1 | 9/2022 | Hickey et al. |

FOREIGN PATENT DOCUMENTS

| | | |
|---|---|---|
| CN | 109385393 B | 1/2021 |
| CN | 109321513 B | 5/2021 |
| DE | 10062626 B4 | 10/2005 |
| IN | 5049CH2013 A | 9/2015 |
| IN | 201911038980 A | 1/2019 |
| WO | 0191821 A1 | 12/2001 |
| WO | 2004065616 A2 | 8/2004 |
| WO | 2004065616 A3 | 11/2004 |
| WO | 2005095585 A1 | 10/2005 |
| WO | 2013056019 A1 | 4/2013 |
| WO | 2013092480 A1 | 6/2013 |
| WO | 2021209257 A1 | 10/2021 |

OTHER PUBLICATIONS

Chang, et al., "Large Full-Thickness Wounded Skin Regeneration Using 3D-Printed Elastic Scaffold with Minimal Functional Unit of Skin", Journal of Tissue Engineering, vol. 13, 2022, pp. 1-17.

Chen, et al., "Three-Dimensional Collagen Topology Shapes Cell Morphology, beyond Stiffness", ACS Biomaterials Science and Engineering, vol. 8, No. 12, 2022, pp. 5284-5294.

Groeber, et al., "A First Vascularized Skin Equivalent as an Alternative to Animal Experimentation", ALTEX, vol. 33, Issue 4, May 15, 2016, pp. 415-422.

Guzelgulgen, "Glucuronoxylan-Based Quince Seed Hydrogel: A Promising Scaffold for Tissue Engineering Applications", International Journal of Biological Macromolecules, vol. 180, 2021, pp. 729-738.

Lee, et al., "Fibroblast-Seeded Collagen Gels in Response to Dynamic Equibiaxial Mechanical Stimuli: A Biomechanical Study", Journal of Biomechanics, vol. 10, No. 178, 2018, pp. 134-142.

Medalie, et al., "Characterization of a Composite Tissue Model that Supports Clonal Growth of Human Melanocytes In Vitro and In Vivo", Journal of Investigative Dermatology, vol. 111, No. 5, Jun. 30, 1998, pp. 810-816.

Merino-Casallo, et al., "A Mechanistic Protrusive-Based Model for 3D Cell Migration", European Journal of Cell Biology, vol. 101, No. 3, 151255, 2022, 18 pages.

Pensalfini, et al., "Factors Affecting the Mechanical Behavior of Collagen Hydrogels for Skin Tissue Engineering", Journal of the Mechanical Behavior of Biomedical Materials, vol. 69, May 2017, pp. 85-97.

Pins, et al., "Plasmin Triggers Rapid Contraction and Degradation of Fibroblast-Populated Collagen Lattices", Journal of Investigative Dermatology, vol. 114, No. 4, Apr. 2000, pp. 647-653.

Wilks, "Directing Fibroblast Self-Assembly to Fabricate Highly-Aligned, Collagen-Rich Matrices", Acta Biomaterialia, vol. 81, Nov. 2018, pp. 70-79.

Wilks, et al., "Quantifying Cell-Derived Changes in Collagen Synthesis, Alignment, and Mechanics in a 3D Connective Tissue Model", Advanced Science, vol. 9, No. 2103939, 2022, pp. 1-14.

Williams, et al., "In Vitro Modulation of Cartilage Shape Plasticity by Biochemical Regulation of Matrix Remodeling", Tissue Engineering Part A, vol. 17, Issue (1-2), 2011, pp. 17-22.

Woodley, et al., "Understanding Fibroblast Behavior in 3D Biomaterials", Tissue Engineering: Part B, vol. 28, No. 3, Aug. 16, 2022, pp. 569-578.

Hopkins, et al., "TGF-β1 Requires IL-13 to Sustain Collagen Accumulation and Increasing Tissue Strength and Stiffness", Connective Tissue Research, 2025, pp. 1-14.

Lin, et al., "Mueller Matrix Analysis of a Biologically Sourced Engineered Tissue Construct as Polarimetric Phantom", Journal of Biomedical Optics, vol. 29, No. 10, 2024, pp. 106002-1-106002-17.

Wu, et al., "An in Vitro Model to Measure the Strength and Stiffness of the Extracellular Matrix Synthesized De Novo by Human Fibroblasts", In Vitro models, 2025, 14 pages.

* cited by examiner

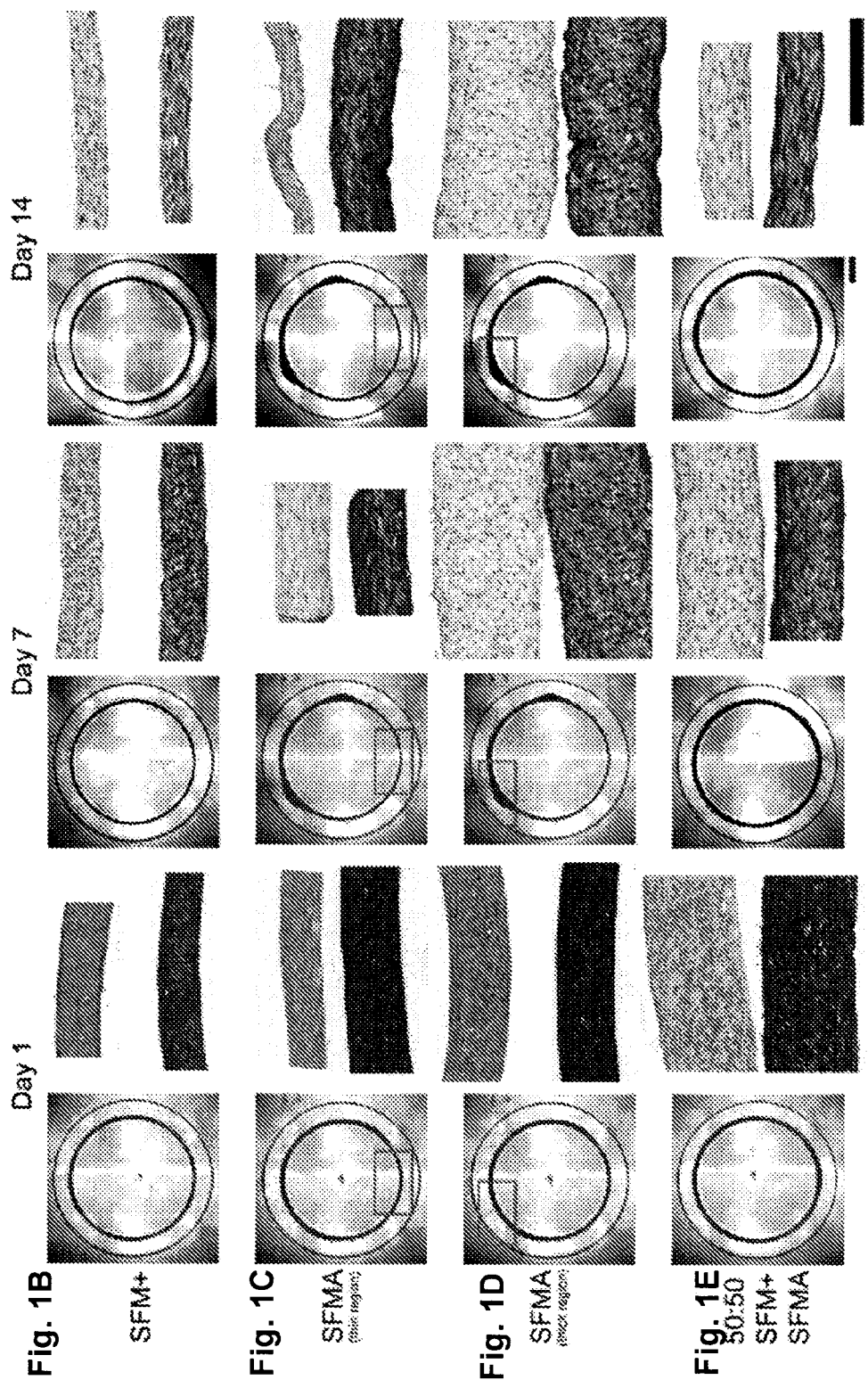

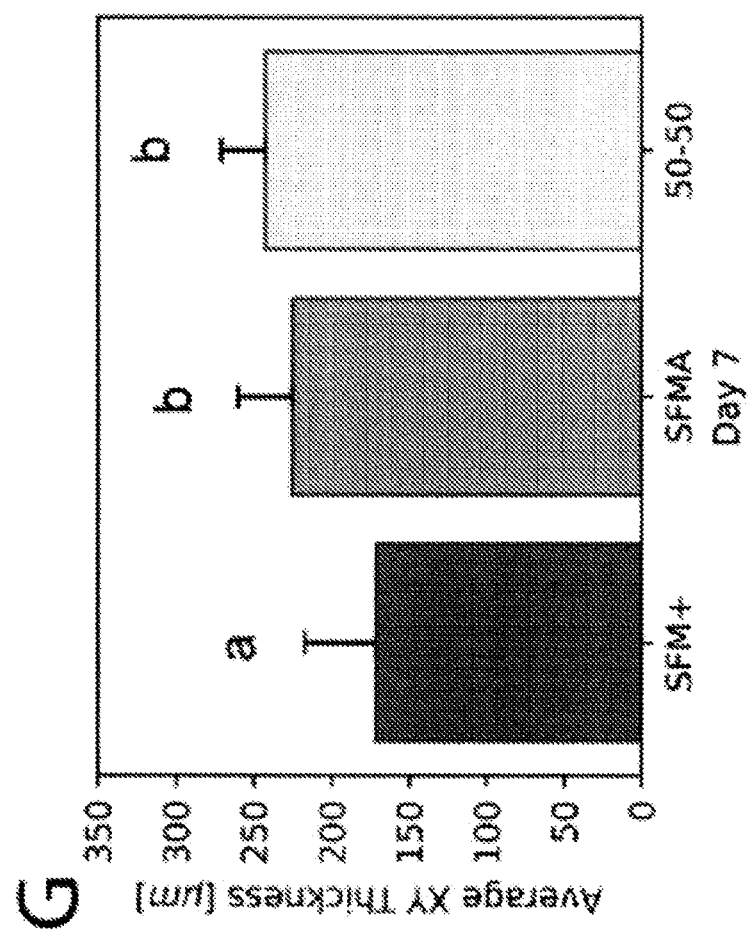

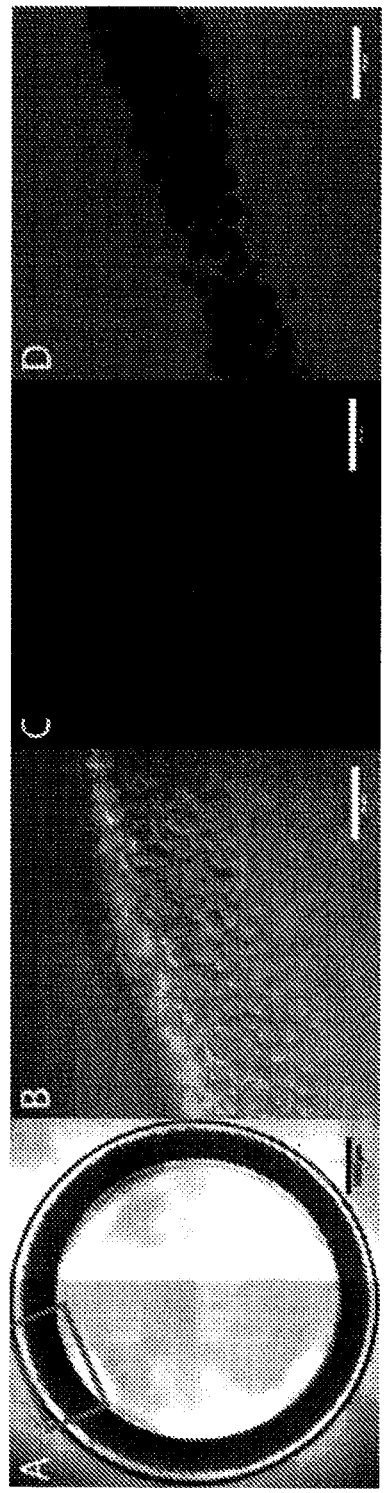

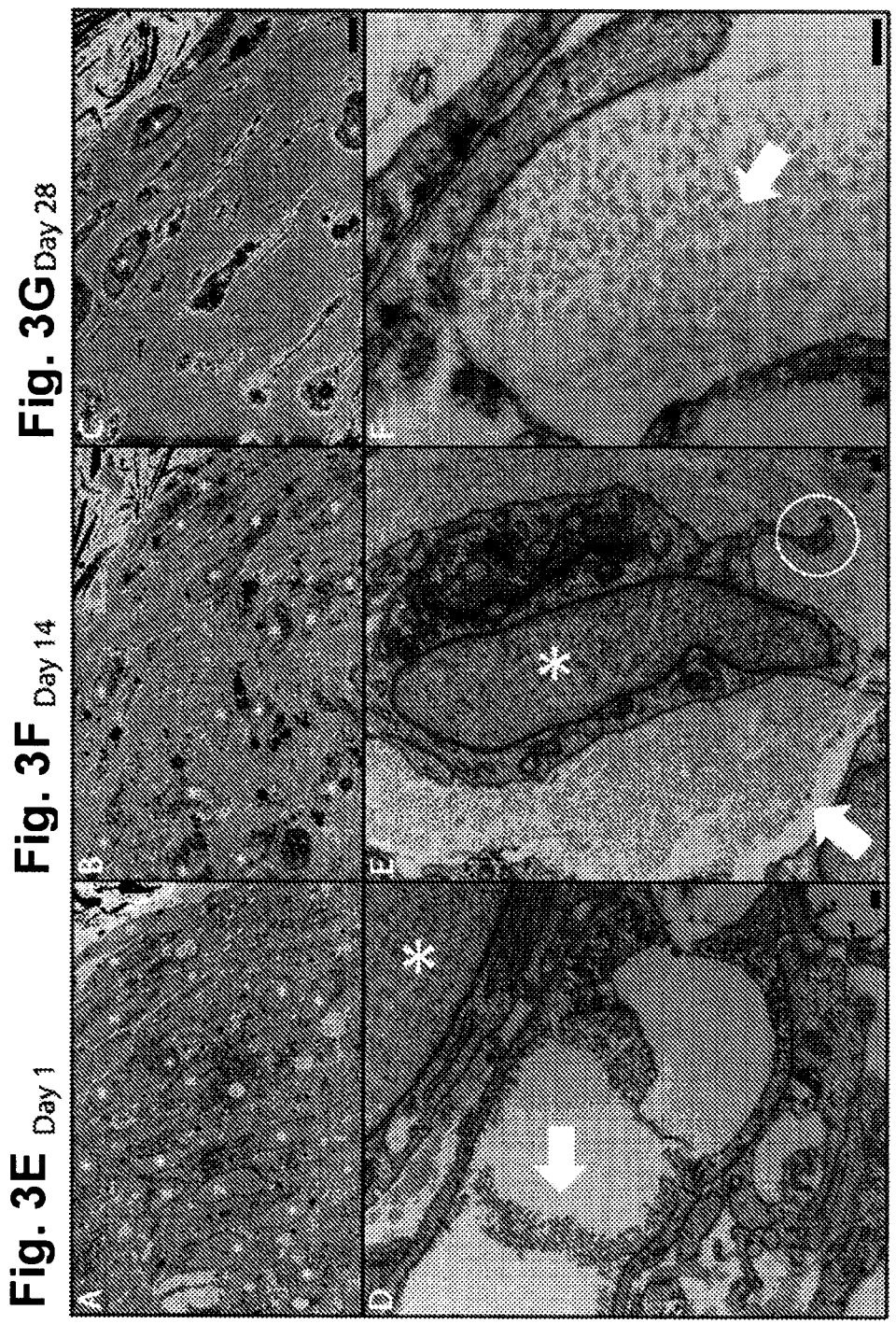

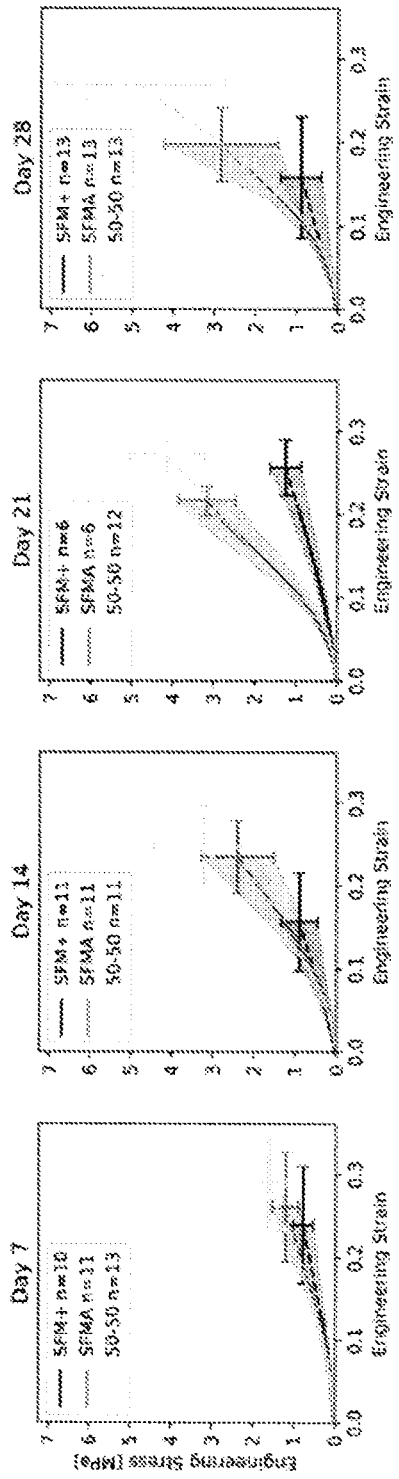
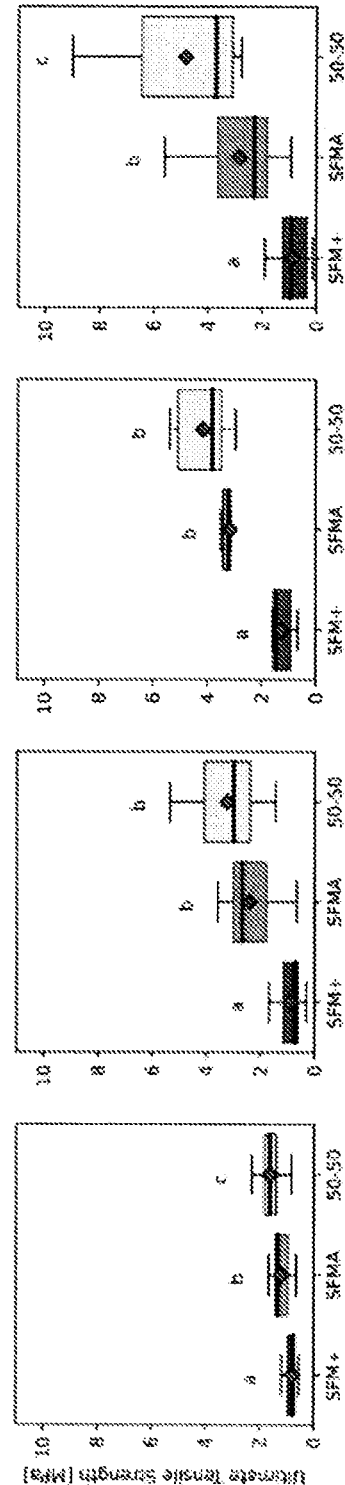
FIG. 4C
FIG. 4D

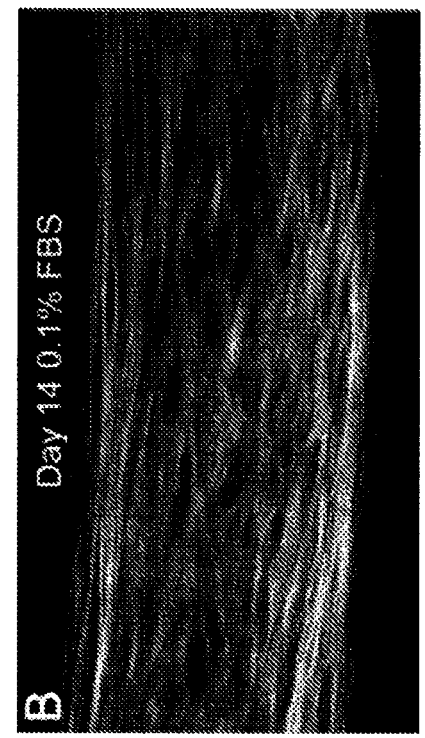
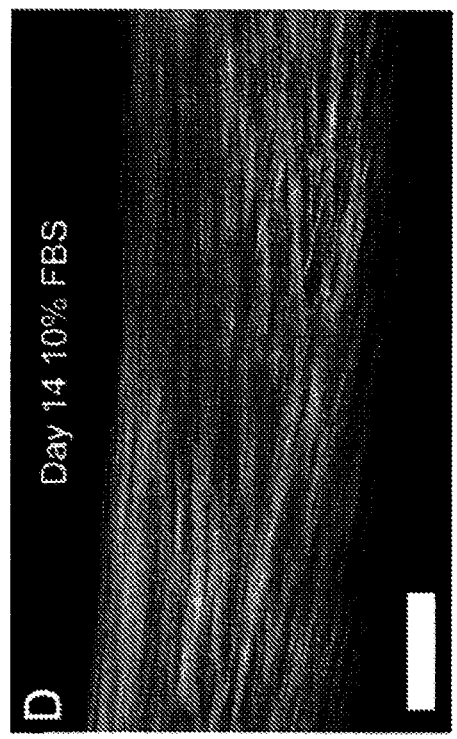
FIG. 6B
FIG. 6D
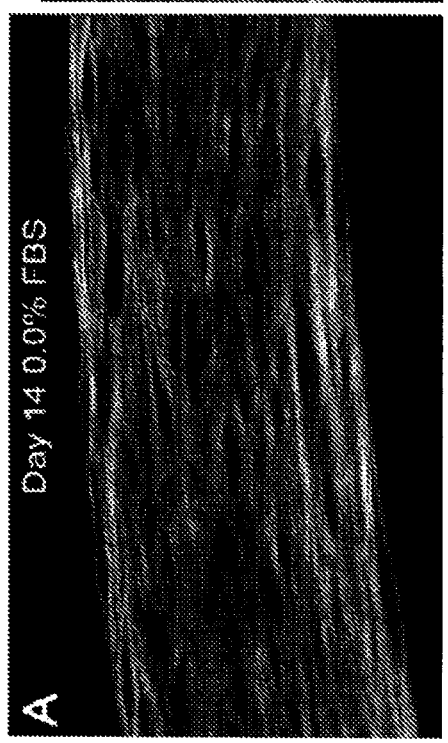
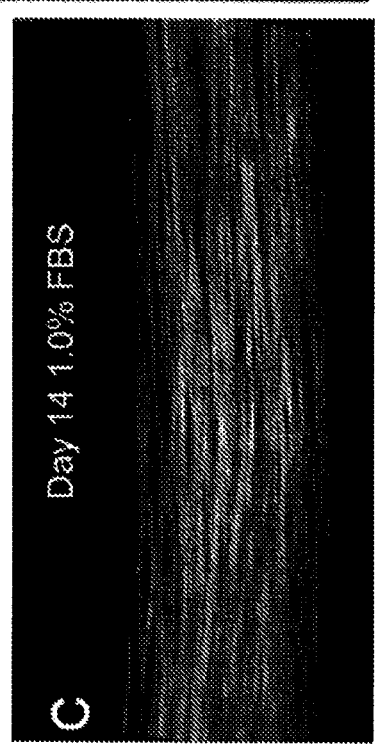
FIG. 6A
FIG. 6C

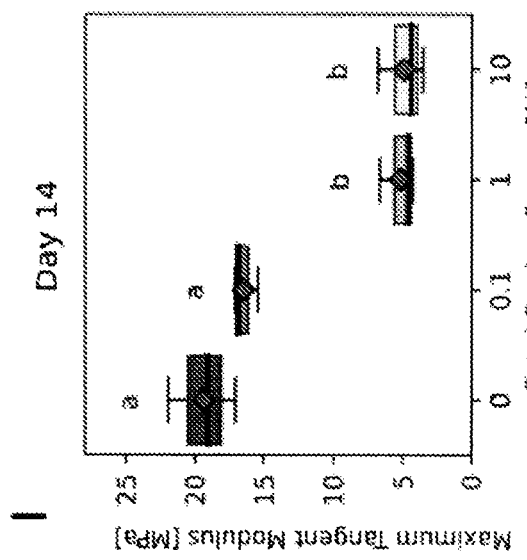
FIG. 6J
FIG. 6I
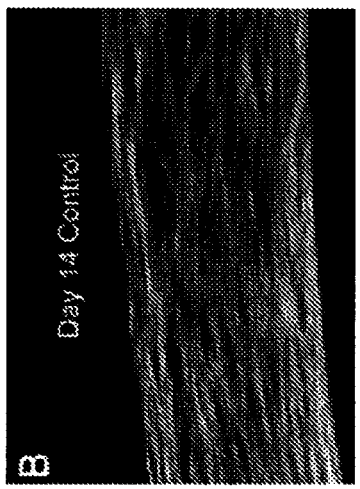
FIG. 7B
FIG. 7A

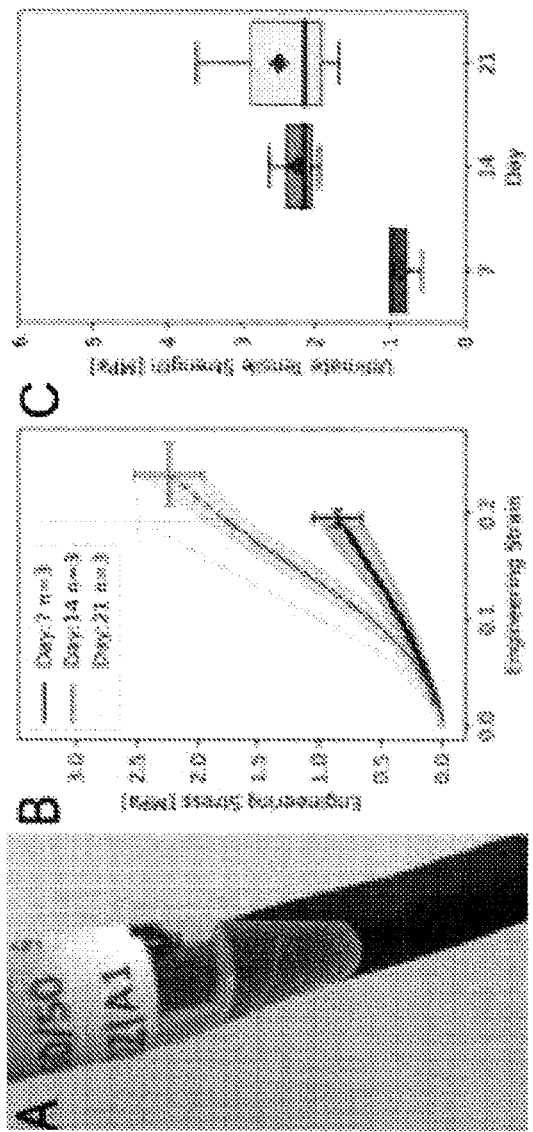

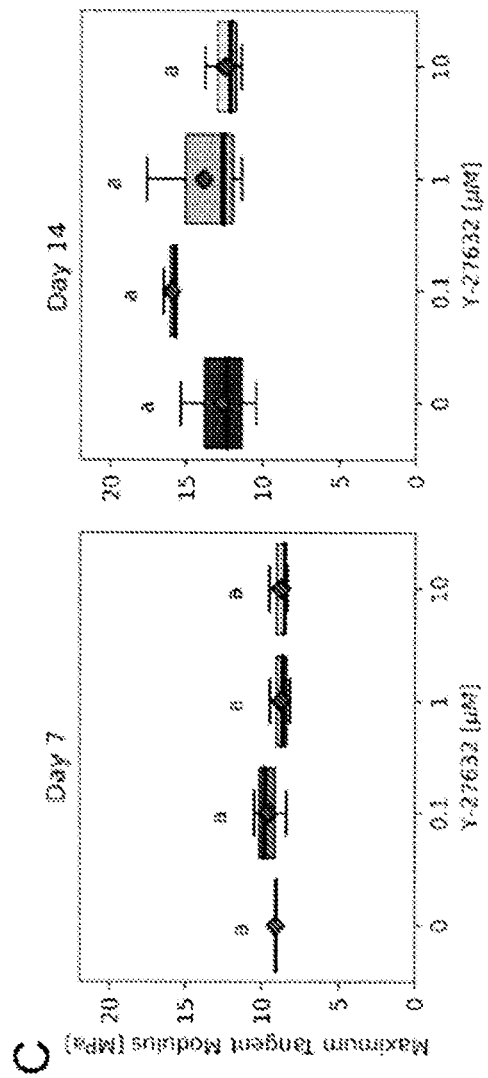
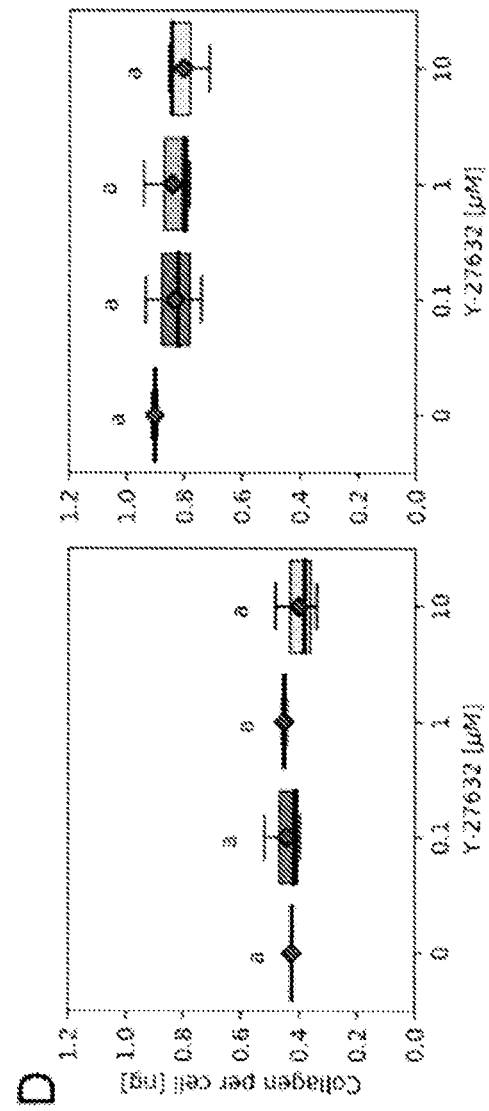
FIG. 10C
FIG. 10D

QUANTIFYING CELL-DERIVED CHANGES IN COLLAGEN SYNTHESIS, ALIGNMENT, AND MECHANICS IN A 3D CONNECTIVE TISSUE MODEL

CROSS REFERENCE TO RELATED APPLICATIONS

This application claims benefit from U.S. Provisional Patent Application Ser. No. 63/314,815, filed Feb. 28, 2022, which is incorporated by reference in its entirety.

STATEMENT REGARDING FEDERALLY SPONSORED RESEARCH OR DEVELOPMENT

This invention was made with government support under grant number 1827422 awarded by the National Science Foundation. The government has certain rights in the invention.

FIELD OF THE INVENTION

The embodiments of the present invention relate to in vitro quantitative methods directed to measurement of 3D extracellular matrix (ECM) organization and mechanics, and the methods provide potential alternatives to the use of animal models.

BACKGROUND OF THE INVENTION

The precise composition and spatial distribution of cells and extracellular matrix (ECM) directly correspond to tissue function. While there has been significant attention devoted to understanding how cellular dysregulation contributes to disease, more recently there has been increased focus on investigating the role that ECM dysregulation plays in disease progression. The importance of cell and matrix organization and composition is particularly apparent in connective tissues, like ligament and tendon, in which fibroblasts and collagen I are the predominant cell type and ECM component, respectively. The uniaxial alignment, high collagen density, hierarchical fibril architecture, and degree of crosslinking enables these tissues to resist high tensile loads which corresponds to their role in maintaining joint stability during skeletal motion.[1,2]

Currently, animal models are the predominant method to study connective tissues and their associated diseases. However, the use of animals is expensive and often requires the development of transgenic models which vary in their ability to recapitulate the pathophysiology of human diseases. Moreover, although ECM proteins such as collagens are highly conserved across species, there are thousands of pathogenic gene variants for connective tissue disorders such as Marfan Syndrome, Ehlers-Danlos syndrome and Osteogenesis Imperfecta making the development of in vivo mutation-specific genotype-phenotype animal studies a considerable challenge.[3,4] However, this could potentially be overcome by the development of more predictive in vitro models.

Accordingly, there is a continuing need for development of accurate predictive models for 3D connective tissues.

BRIEF SUMMARY OF THE INVENTION

The embodiments of the present invention provide quantitative methods and engineered tissue models that are predictive of human health and disease. In some embodiments, the methods disclosed herein provide in vitro models that recapitulate the matrix-rich anisotropic architecture of 3D tissues in order to mirror their mechanical phenotype, which is a direct measure of their function.

The methods described in the technology herein have important applications in several fields, for example, including tissue engineering (e.g., tissues that can be used in transplantation), in vitro models, genetic testing (e.g., expressed henotype), drug testing, and drug discovery. For example, in the fields of drug discovery and toxicity testing, the quantitative methods can be utilized to determine a dose response without utilizing animal models.

The quantitative methods disclosed herein provide experimental techniques for investigating the role of mechanotransduction pathways, media composition, growth factors, or drugs on cell-mediated synthesis and alignment of ECM and how changes in 3D ECM composition and architecture alter tissue mechanics and function such as in diseases like fibrosis.

The present invention, in one of its broadest embodiments, provides a method for quantifying changes in 3D extracellular matrix (ECM) mechanics and organization, the method comprising the steps of: (1) obtaining a non-adhesive cell culture well including a peg disposed in the well operative to develop cellular alignment around the peg; (2) seeding the culture well with a culture medium and anchorage-dependent cells capable of synthesizing ECM components; (3) cultivating the cells, optionally in the presence of one or more test conditions, whereby the cells adhere to one another, exert cytoskeleton-mediated tension and/or cell-driven self-assembly to form a 3D ring-shaped geometry tissue ECM around the peg; and (4) measuring one or more properties of the tissue ECM and/or the cells.

In some embodiments, the cultivating is performed in the absence of an exogenously added scaffolding material and/or a material known to be adhesive for cells or operative as an anchoring material. According to some aspects, the cultivating is performed without application of an externally applied force.

In some embodiments, the method is operative to effect a quantitative change in one or more properties of the tissue ECM and/or the cells due to a presence, absence, and/or a difference in amount/magnitude of the one or more test conditions; wherein the quantitative change is proportional to the one or more test conditions.

In some embodiments, the cellular alignment is directed by cell-derived forces, cell-mediated tension, and/or circumferential cellular alignment around the peg.

In some embodiments, the methods described above can further comprise the step of: (a) removing the tissue ECM and/or the cells from the culture well; and can be executed wherein step (a) is performed after step (3) but before step (4); or wherein step (a) is performed after step (4).

In some embodiments, the measuring comprises observations with or without aid of instrumentation; measurement of structure-function relationships; measurement of geometry of ECM, size of ECM, alignment of ECM, spatial distribution of cells and/or of ECM; instantaneous relaxation of ECM after removal from the culture well; ECM or collagen crimping behavior; quantification using a minimum cross-sectional area or a mean cross-sectional area; measurement of ECM or collagen content per cell; measurement of histology, multiphoton second-harmonic generation, electron microscopy, and/or serial block-face scanning electron microscopy; measurement of mechanical testing, tensile strength, maximum tangent modulus, stiffness, failure strain, thickness measurement (x-y), and/or length measurement (z); measurement of circumferentially-aligned fibrillar ECM or collagen; video, imaging, and/or microscopy; pepsin-acid soluble collagen fraction; measurement of tissue homeostasis and/or dysregulation; hematoxylin and eosin staining, or Masson's trichrome staining; measurement of a degree of crosslinking; measurement including a simulation of motion; measurement of cell-derived changes, changes in synthesis, organization, alignment, and/or mechanics of the ECM; fatigue testing; measurement of one or more secreted soluble factors in the culture medium; measurement of proteomics; measurement of genomics; or a combination thereof.

In some embodiments, the test condition comprises an aging condition, mechano-transduction pathways, genotype and/or phenotype differences, addition of nucleic acids or amino acids, presence of an additional cell type, presence of a virus and/or prion, difference in medium composition, difference in concentration of one or more factors, growth factors, drugs affecting cell-mediated synthesis, one or more biological perturbations, fetal bovine serum, ROCK-Inhibitor, TGF-β1 inhibitor, an interleukin, a nutrient formulation, electromagnetic radiation, particle bombardment, gravitational force, oxygen and/or gas level, a cytokine, temperature, mechanical conditioning, vibration or motion, pressure or vacuum, time, differences in cell origin(s), gene mutations affecting ECM synthesis, organization, and/or mechanics relevant to connective tissue diseases, or a combination thereof.

According to some aspects, the one or more properties of the tissue ECM (experimental) are compared to a tissue ECM cultivated without a presence of the test condition, a native tissue ECM, or a tissue ECM cultivated in vivo (control); and wherein the comparison is operative to provide a dose (factor) response including the control and the experimental.

In some embodiments, the methods are performed wherein the medium is serum-free. In some embodiments, the culture well and/or the peg comprises a hydrogel. In some embodiments, the well and/or the peg comprises non-adhesive agarose.

In some embodiments, the absence of a scaffolding material and/or an externally applied force is operative to provide no cell-scaffold biophysical crosstalk and/or cell-external force biophysical crosstalk.

According to some aspects, the technology provides a method of investigating, diagnosing, and/or treating a disease or condition comprising any of the methods disclosed above. A method of investigating or diagnosing fibrosis, Marfan Syndrome, Loeys-Dietz syndrome, a deregulated TGF-β signaling, cancer, changes in tissue mechanics, tissue mechanical failure, Ehlers-Danlos syndrome, or Osteogenesis Imperfecta can comprise the methods disclosed herein. The method can optionally include investigating or diagnosing a method of treating.

In some embodiments, a quantitative screening method for therapeutic agents or a method for evaluating the efficacy or toxicity of a therapeutic agent candidate substance acting on cells or tissues comprising the methods disclosed above.

In some embodiments, a method of culturing cells, ECM, or tissues, comprising the methods disclosed herein is provided, with the proviso that the methods can be performed with or without the test condition.

In some embodiments, the methods can be wherein the cells comprise or are derived from neonate male foreskin, dermis, tendon, lung, umbilical cords, cartilage, urethra, corneal stroma, oral mucosa, intestine, bone marrow, placenta, amnion, muscle, adipose, bone; or wherein the ECM producing cells comprise human dermal fibroblasts or human umbilical cord perivascular cells. fibroblasts, stromal cells, mesenchymal stem cells, transfected cells, recombinant cells, genetically engineered cells, normal cells, immune cells such as macrophages, eosinophils, or a combination thereof. In some embodiments, the culture medium comprises spheroids including cells, monodispersed cells, or a combination thereof.

In some embodiments, the cell culture well can include cells suitable for cultivation upon initially obtaining the well.

Other implementations are also described and recited herein.

BRIEF DESCRIPTION OF THE DRAWINGS

For the purpose of illustration, certain embodiments of the present invention are shown in the drawings described below. It should be understood, however, that the invention is not limited to the precise arrangements, methods, dimensions, and instruments shown. In the drawings:

FIG. 3 provides microscopic images at increasing timepoints for tissue constructs. Brightfield and SHG images of tissue constructs acquired 4 h after seeding showed a rounded cell morphology and no fibrillar collagen (FIG. 3A, scale bar=1000 μm), (FIG. 3B, FIG. 3C, FIG. 3D, scale bars=50 μm). Using transmission electron microscopy and serial block-face scanning electron microscopy, by day 1, there was a qualitative increase in cellular organization particularly near the surface of the tissues and similarly high density of cells with the appearance of some collagen fibrils (FIG. 3E, FIG. 3H). Day 14 tissues were characterized by a significant increase in collagen fibrils with individual cells enmeshed in newly secreted collagen and a decrease in the density of cells (FIG. 3F, FIG. 3I). Cells maintained contacts between neighbors with long projections that could be seen interspersed between collagen fibrils. By day 28 collagen fibrils were less packed and there were increased collagen fibrils out of plane suggesting a decrease in organization as well as a decrease in cellularity (FIG. 3G, FIG. 3J).

DETAILED DESCRIPTION OF THE INVENTION

Figure 1A:
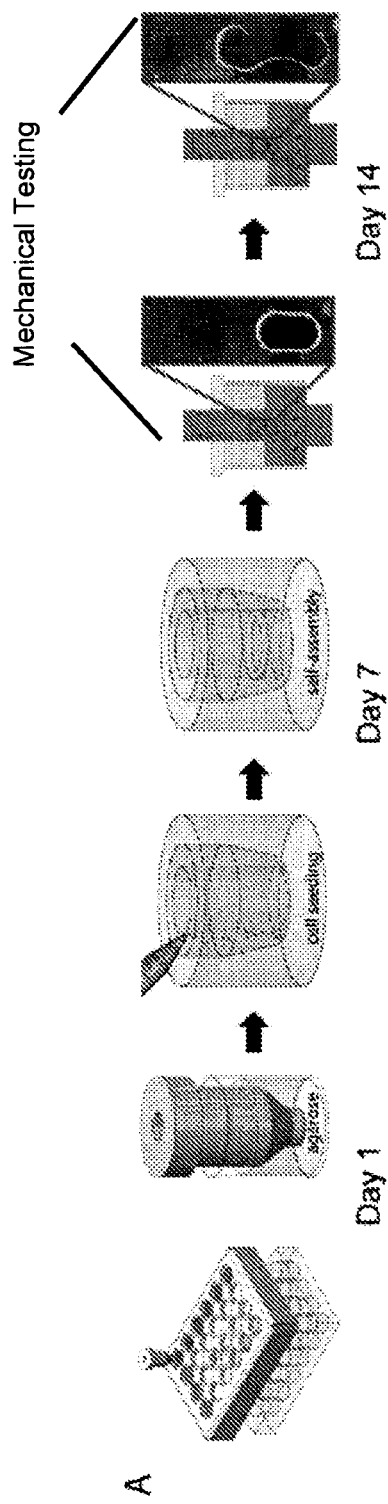
In FIG. 1A, stainless steel inserts are placed into wells including agarose (left of Day 1). After 10-15 min, the stainless-steel inserts are removed and wells are left with 3D non-adhesive agarose gels with a 5 mm diameter central inner peg surrounded by a ring-shaped trough in which cells can be seeded, settle, self-assemble into ring-shaped tissue constructs, and be used for downstream assays like mechanical testing to failure at 7-to-28-day timepoints (e.g., FIG. 1A, right). In an example, after equilibrating gels for at least 24 h in serum-free DMEM, human fibroblasts were seeded in either serum-free media supplemented with collagen promoting supplements (SFM+), advanced DMEM (SFMA), or a 50:50 combination of the two and imaged daily (FIG. 1B-FIG. 1E) and the x-y thickness of the tissues was measured over time (FIG. 1F, FIG. 1G, one-way ANOVA with post-hoc Tukey HSD, $p<0.05$). Variation in tissue thickness uniformity was quantified over 7 days (FIG. 1H). The coefficient of variation of tissue thickness (FIG. 1I) was quantified as a function of media composition and time (FIG. 1I, One-way ANOVA with post-hoc Tukey HSD, $p<0.05$). Data presented as mean±S.D., n=24. The scale bars=1000, 200 μm. Tissue rings seeded with $3\times10^5$ cells that were cultured in SFMA media for 14 days were fixed, embedded and sections stained with Masson's trichrome, and images from thick (FIG. 1J) and thin (FIG. 1K) regions are shown.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention. It is to be appreciated that certain aspects, modes, embodiments, variations and features of the invention are described below in various levels of detail in order to provide a substantial understanding of the present invention.

Definitions

For convenience, the meaning of some terms and phrases used in the specification, examples, and appended claims, are provided below. Unless stated otherwise, or implicit from context, the following terms and phrases include the meanings provided below. The definitions are provided to aid in describing particular embodiments, and are not intended to limit the claimed invention, because the scope of the invention is limited only by the claims. Unless otherwise defined, all technical and scientific terms used herein have the same meaning as commonly understood by one of ordinary skill in the art to which this invention belongs. If there is an apparent discrepancy between the usage of a term in the art and its definition provided herein, the definition provided within the specification shall prevail.

As used in this specification and the appended claims, the singular forms "a," "an" and "the" include plural referents unless the content clearly dictates otherwise. For example, reference to "a cell" includes a combination of two or more cells, and the like.

As used herein, the term "approximately" or "about" in reference to a value or parameter are generally taken to include numbers that fall within a range of 5%, 10%, 15%, or 20% in either direction (greater than or less than) of the number unless otherwise stated or otherwise evident from the context (except where such number would be less than 0% or exceed 100% of a possible value). As used herein, reference to "approximately" or "about" a value or parameter includes (and describes) embodiments that are directed to that value or parameter. For example, description referring to "about X" includes description of "X".

As used herein, the term "or" means "and/or." The term "and/or" as used in a phrase such as "A and/or B" herein is intended to include both A and B; A or B; A (alone); and B (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

As used herein, the term "comprising" means that other elements can also be present in addition to the defined elements presented. The use of "comprising" indicates inclusion rather than limitation.

The term "consisting of" refers to compositions, methods, and respective components thereof as described herein, which are exclusive of any element not recited in that description of the embodiment.

As used herein the term "consisting essentially of" refers to those elements required for a given embodiment. The term permits the presence of additional elements that do not materially affect the basic and novel or functional characteristic(s) of that embodiment of the invention.

The term "statistically significant" or "significantly" refers to statistical significance and generally means a two-standard deviation (2SD) or greater difference.

As used herein, the term "subject" refers to a mammal, including but not limited to a dog, cat, horse, cow, pig, sheep, goat, chicken, rodent, or primate. Subjects can be house pets (e.g., dogs, cats), agricultural stock animals (e.g., cows, horses, pigs, chickens, etc.), laboratory animals (e.g., mice, rats, rabbits, etc.), but are not so limited. Subjects include human subjects. The human subject may be a pediatric, adult, or a geriatric subject. The human subject may be of either sex.

As used herein, the terms "effective amount" and "therapeutically effective amount" include an amount sufficient to prevent or ameliorate a manifestation of disease or medical condition, such as cancer. It will be appreciated that there will be many ways known in the art to determine the effective amount for a given application. For example, the pharmacological methods for dosage determination may be used in the therapeutic context. In the context of therapeutic or prophylactic applications, the amount of a composition administered to the subject will depend on the type and severity of the disease and on the characteristics of the individual, such as general health, age, sex, body weight and tolerance to drugs. It will also depend on the degree, severity and type of disease. The skilled artisan will be able to determine appropriate dosages depending on these and other factors. The compositions can also be administered in combination with one or more additional therapeutic compounds.

As used herein, the term "cancer" relates generally to a class of diseases or conditions in which abnormal cells divide without control and can invade nearby tissues. Cancer cells can also spread to other parts of the body through the blood and lymph systems. There are several main types of cancer. Carcinoma is a cancer that begins in the skin or in tissues that line or cover internal organs. Sarcoma is a cancer that begins in bone, cartilage, fat, muscle, blood vessels, or other connective or supportive tissue. Leukemia is a cancer that starts in blood-forming tissue such as the bone marrow and causes large numbers of abnormal blood cells to be produced and enter the blood. Lymphoma and multiple myeloma are cancers that begin in the cells of the immune system. Central nervous system cancers are cancers that begin in the tissues of the brain and spinal cord.

In some embodiments of any of the aspects, the cancer is a primary cancer. In some embodiments of any of the aspects, the cancer is a malignant cancer. As used herein, the term "malignant" refers to a cancer in which a group of tumor cells display one or more of uncontrolled growth (i.e., division beyond normal limits), invasion (i.e., intrusion on and destruction of adjacent tissues), and metastasis (i.e., spread to other locations in the body via lymph or blood). As used herein, the term "metastasize" refers to the spread of cancer from one part of the body to another. A tumor formed by cells that have spread is called a "metastatic tumor" or a "metastasis." The metastatic tumor contains cells that are like those in the original (primary) tumor.

As used herein, the term "benign" or "non-malignant" refers to tumors that may grow larger but do not spread to other parts of the body. Benign tumors are self-limited and typically do not invade or metastasize.

A "cancer cell" or "tumor cell" refers to an individual cell of a cancerous growth or tissue. A tumor refers generally to a swelling or lesion formed by an abnormal growth of cells, which may be benign, pre-malignant, or malignant. Most cancer cells form tumors, but some, e.g., leukemia, do not necessarily form tumors. For those cancer cells that form tumors, the terms cancer (cell) and tumor (cell) are used interchangeably.

A subject that has a cancer or a tumor is a subject having objectively measurable cancer cells present in the subject's body. Included in this definition are malignant, actively proliferative cancers, as well as potentially dormant tumors or micrometastatses. Cancers which migrate from their original location and seed other vital organs can eventually lead to the death of the subject through the functional deterioration of the affected organs. Hemopoietic cancers, such as leukemia, are able to out-compete the normal hemopoietic compartments in a subject, thereby leading to hemopoietic failure (in the form of anemia, thrombocytopenia and neutropenia) ultimately causing death.

Examples of cancer include but are not limited to, carcinoma, lymphoma, blastoma, sarcoma, leukemia, basal cell carcinoma, biliary tract cancer; bladder cancer; bone cancer; brain and CNS cancer; breast cancer; cancer of the peritoneum; cervical cancer; choriocarcinoma; colon and rectum cancer; connective tissue cancer; cancer of the digestive system; endometrial cancer; esophageal cancer; eye cancer;

cancer of the head and neck; gastric cancer (including gastrointestinal cancer); glioblastoma (GBM); hepatic carcinoma; hepatoma; intra-epithelial neoplasm; kidney or renal cancer; larynx cancer; leukemia; liver cancer; lung cancer (e.g., small-cell lung cancer, non-small cell lung cancer, adenocarcinoma of the lung, and squamous carcinoma of the lung); lymphoma including Hodgkin's and non-Hodgkin's lymphoma; melanoma; myeloma; neuroblastoma; oral cavity cancer (e.g., lip, tongue, mouth, and pharynx); ovarian cancer; pancreatic cancer; prostate cancer; retinoblastoma; rhabdomyosarcoma; rectal cancer; cancer of the respiratory system; salivary gland carcinoma; sarcoma; skin cancer; squamous cell cancer; stomach cancer; testicular cancer; thyroid cancer; uterine or endometrial cancer; cancer of the urinary system; vulval cancer; as well as other carcinomas and sarcomas; as well as B-cell lymphoma (including low grade/follicular non-Hodgkin's lymphoma (NHL); small lymphocytic (SL) NHL; intermediate grade/follicular NHL; intermediate grade diffuse NHL; high grade immunoblastic NHL; high grade lymphoblastic NHL; high grade small non-cleaved cell NHL; bulky disease NHL; mantle cell lymphoma; AIDS-related lymphoma; and Waldenstrom's Macroglobulinemia); chronic lymphocytic leukemia (CLL); acute lymphoblastic leukemia (ALL); Hairy cell leukemia; chronic myeloblastic leukemia; and post-transplant lymphoproliferative disorder (PTLD), as well as abnormal vascular proliferation associated with phakomatoses, edema (such as that associated with brain tumors), and Meigs' syndrome.

A "cancer cell" is a cancerous, pre-cancerous, or transformed cell, either in vivo, ex vivo, or in tissue culture, that has spontaneous or induced phenotypic changes that do not necessarily involve the uptake of new genetic material. Although transformation can arise from infection with a transforming virus and incorporation of new genomic nucleic acid, or uptake of exogenous nucleic acid, it can also arise spontaneously or following exposure to a carcinogen, thereby mutating an endogenous gene. Transformation/cancer is associated with, e.g., morphological changes, immortalization of cells, aberrant growth control, foci formation, anchorage independence, malignancy, loss of contact inhibition and density limitation of growth, growth factor or serum independence, tumor specific markers, invasiveness or metastasis, and tumor growth in suitable animal hosts such as nude mice.

As used herein, the terms "treat," "treatment," "treating," or "amelioration" when used in reference to a disease, disorder or medical condition, refer to therapeutic treatments for a condition, wherein the object is to reverse, alleviate, ameliorate, inhibit, slow down or stop the progression or severity of a symptom or condition. The term "treating" includes reducing or alleviating at least one adverse effect or symptom of a condition. Treatment is generally "effective" if one or more symptoms or clinical markers are reduced. Alternatively, treatment is "effective" if the progression of a condition is reduced or halted. That is, "treatment" includes not just the improvement of symptoms or markers, but also a cessation or at least slowing of progress or worsening of symptoms that would be expected in the absence of treatment. Beneficial or desired clinical results include, but are not limited to, alleviation of one or more symptom(s), diminishment of extent of the deficit, stabilized (i.e., not worsening) state of a tumor or malignancy, delay or slowing of tumor growth and/or metastasis, and an increased lifespan as compared to that expected in the absence of treatment.

The terms "decrease", "reduced", "reduction", or "inhibit" are all used herein to mean a decrease by a statistically significant amount. In some embodiments, "reduce," "reduction" or "decrease" or "inhibit" typically means a decrease by at least 10% as compared to a reference level (e.g., the absence of a given treatment or agent) and can include, for example, a decrease by at least about 10%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 98%, at least about 99%, or more. As used herein, "reduction" or "inhibition" does not encompass a complete inhibition or reduction as compared to a reference level. "Complete inhibition" is a 100% inhibition as compared to a reference level. A decrease can be preferably down to a level accepted as within the range of normal for an individual without a given disorder.

The terms "increased", "increase", "enhance", or "activate" are all used herein to mean an increase by a statically significant amount. In some embodiments, the terms "increased", "increase", "enhance", or "activate" can mean an increase of at least 10% as compared to a reference level, for example an increase of at least about 20%, or at least about 30%, or at least about 40%, or at least about 50%, or at least about 60%, or at least about 70%, or at least about 80%, or at least about 90% or up to and including a 100% increase or any increase between 10-100% as compared to a reference level, or at least about a 2-fold, or at least about a 3-fold, or at least about a 4-fold, or at least about a 5-fold or at least about a 10-fold increase, or any increase between 2-fold and 10-fold or greater as compared to a reference level. In the context of a marker or symptom, a "increase" is a statistically significant increase in such level.

Other terms are defined herein within the description of the various aspects of the invention.

Quantifying Cell-Derived Changes in Collagen Synthesis, Alignment, and Mechanics in a 3D Connective Tissue Model The dysregulation of extracellular matrix (ECM) synthesis, organization, and mechanics are hallmark features of diseases like fibrosis and cancer. However, most in vitro models fail to recapitulate the three-dimensional (3D) multiscale hierarchical architecture of collagen-rich tissues and as a result, are unable to mirror native or disease phenotypes. Herein, using primary human fibroblasts seeded into custom fabricated 3D non-adhesive agarose molds, a novel strategy is proposed to direct the morphogenesis of engineered 3D ring-shaped tissue constructs with tensile and histological properties that recapitulate key features of fibrous connective tissue. To characterize the shift from monodispersed cells to a highly-aligned, collagen-rich matrix, a multimodal approach integrating histology, multiphoton second-harmonic generation, and electron microscopy is employed. Structural changes in collagen synthesis and alignment are then mapped to functional differences in tissue mechanics and total collagen content. Due to the absence of an exogenously added scaffolding material, this model enables the direct quantification of cell-derived changes in 3D matrix synthesis, alignment, and mechanics in response to the addition or removal of relevant biomolecular perturbations. To illustrate this, the effects of nutrient composition, fetal bovine serum, rho-kinase inhibitor, and pro- and anti-fibrotic compounds on ECM synthesis, 3D collagen architecture, and mechanophenotype are quantified.

While there have been a number of methods developed to quantify the forces exerted by cells, there are far fewer in vitro tools to control and quantify the organization of cells, the de novo synthesis and organization of ECM, and the resulting mechanical properties in 3D.[5, 6, 7] Furthermore, although there has been progress in developing complex in vitro models of ligaments and tendons,[8] nearly all existing models rely on cells embedded in exogenous protein or polymer scaffolds.[9] This scaffolding makes it difficult to decouple potentially confounding effects from cell-scaffold biophysical crosstalk, which is a barrier to directly quantifying changes in cell-mediated synthesis and alignment of de novo ECM and the resulting changes in tissue mechanics. Moreover, the majority of 2D and 3D in vitro models do not recapitulate the functional properties of connective tissues like ligaments and tendons-their mechanical properties. This is in large part because these models do not replicate the anisotropic, collagen-dense ECM interspersed with a network of elongated fibroblast-like cells which together are responsible for the distinct mechanical and biochemical properties of these tissues.

To address these limitations, here is disclosed a purely cell-based approach to fabricating fibroblast-derived, ring-shaped tissue constructs that develop cell-mediated tension, synthesize a highly-organized human ECM de novo, and recapitulate the histological and mechanical phenotype of ligament-like tissues. We use a multi-scale approach integrating histology, multiphoton second harmonic generation (SHG), and electron microscopy (EM) with biochemical techniques to investigate the shift from monodispersed human primary fibroblasts to a highly organized 3D tissue architecture comprised of cells enmeshed in the collagen-rich ECM they synthesized, secreted and assembled de novo. We demonstrate the role nutrient formulation and time play on the development of cellular alignment, collagen synthesis, and mechanical properties with later time points approaching physiologically relevant mechanical properties. We find that fetal bovine serum (FBS) has a dose-dependent negative effect on the development of mechanics, which is notable considering the vast majority of in vitro cell-based models rely on the use of serum. We demonstrate that the rho-associated protein kinase (ROCK) inhibitor Y-27632 has no effect on the mechanical properties of the tissues at the doses tested suggesting that ROCK signaling pathways may not be essential for the development of tensile properties. Finally, we show that Transforming growth factor (TGF)-β1, a pleiotropic signaling molecule identified as a master mediator of fibrosis, and SB-431542, an inhibitor of TGF-β1, alter tissue mechanics in a dose-dependent manner with TGF-β1 increasing tissue stiffness and strength, a hallmark clinical feature of fibrotic disease progression, and SB-431542 decreasing tissue stiffness and strength after 7 and 14 days of treatment.

Prior work showed that the alignment of collagen and cells was inversely related to cell seeding density, with lower seeding density corresponding to higher alignment.[10] The importance of ECM composition and organization in tissue homeostasis and dysregulation are becoming increasingly recognized. Consequently, there is a significant need for the development of 3D tissue models that can recapitulate native ECM architecture and function to better understand disease pathophysiology and inform the development of potential therapeutics. Unlike other models that rely on externally applied forces to direct cell alignment, to replicate ligament and tendon architecture in our model, we use a bottom-up cell-based tissue engineering approach to direct cellular alignment by harnessing the tendency for anchorage-dependent cells placed on a non-adhesive substrate to adhere to one another, self-aggregate, and compact into a spheroid geometry.[11, 12, 13] By placing a non-adhesive peg in the center of the well, the peg acts as an inert barrier that guides the formation of a ring-shaped tissue morphology as monodispersed cells adhere to one another, exert cytoskeleton-mediated tension, and develop circumferential cellular alignment around the peg.[14, 15, 16, 17] Manning et al. showed that coaction between cell adhesion molecules and cortical tension in zebrafish ectoderm aggregates led to the development of tissue surface tension corresponding to a drastic increase in cell area at the surface compared to the bulk.[18] This may explain the differences we see in surface versus bulk cell and collagen organization in the histology data (e.g., FIG. 1J, FIG. 1K). It also suggests that thinner tissues, whether from reduced initial cell seeding number or variations in regional thickness, would have increased surface tension and subsequent cell and ECM alignment due to an increase in the surface area to volume ratio, in agreement with our data. However, differences in cell and ECM alignment as a function of cell seeding density could also be explained by other phenomena like nutrient availability arising from 3D concentration gradients.

In models of tendon embryology, others have shown that actomyosin contraction is important for cellular reorganization and the development of tissue mechanics by aligning newly synthesized collagen, and that disruption of the actomyosin network with cytochalasin or blebbistatin halts the development of mechanical properties.[19, 20] Interestingly, in our model, inhibition of rho-kinase after 24 h of self-assembly, which plays important roles in cellular motility, shape, and contractility, did not have a significant effect on mechanical properties or collagen synthesis over 7 or 14 days for any of the Y-27632 doses tested (e.g., FIGS. 10A-10D). This suggests that the development of tissue mechanics in our model can occur independently of rhokinase, though future studies will investigate other mediators of actomyosin contractility and more potent ROCK inhibitors.

In addition to using this model to test the role of rho-kinase, we were also interested in characterizing the effects of growth media on ECM synthesis and mechanics due to the important role of nutrient formulation on cell signaling and phenotype.[21, 22] Advanced DMEM (SFMA) was designed to reduce the need for serum in cell culture and contains cell survival signals like insulin, transferrin, selenium, ethanolamine, and glutathione, whereas high glucose DMEM was supplemented with a stable form of ascorbic acid (SFM+), an essential cofactor in collagen biosynthesis. Interestingly, the similarity in mechanical properties between 50:50 and SFMA tissues may suggest a minimum concentration of some component in SFMA that confers positive effects on the synthesis of collagen and development of mechanical properties, that in excess may have a deleterious effect on the uniformity in tissue cross-section. In future studies, it would be interesting to explore other ratios of SFM+ to SFMA.

Unlike other cell types in which a quiescent state is often characterized by a decrease in metabolic activity, fibroblast quiescence is reported to have high metabolic activity with a shift in energy allocation from proliferation to cellular processes related to ECM synthesis and remodeling as well as increased macromolecule recycling via autophagy.[23] Moreover, fibroblasts in vitro have been shown to remain viable in a serum-starved state for at least 30 days prior to re-entering the cell cycle.[24] Mitogen withdrawal, contact inhibition, and loss of adhesion, each of which independently induce fibroblast quiescence, are all signals that are present in our purely cell-based 3D model.[25, 26] Taken together, these experimental conditions could potentially induce a shift in fibroblast phenotype from proliferative towards quiescent which may account for the rapid synthesis of ECM visualized with histology, SHG, and electron microscopy and the subsequent increase in tissue stiffness and strength in the tissue constructs.

However, further characterizations are needed to investigate cell cycle and alpha-smooth muscle actin expression to accurately assess fibroblast phenotype in our system, which unlike most systems has no exogenously added scaffold material and as a result, a distinct microenvironment. Additionally, while human dermal fibroblasts were selected for their broad accessibility and prior studies showing similar proliferation, ECM synthesis, and mechanical properties of engineered tissue constructs derived from tenocytes, in future studies it would be interesting to compare tissue specific fibroblasts, tenocytes, and other mesenchymal cells to investigate how cell origin may alter tissue construct phenotype.[27, 28] Although the shift in the proportion of ECM to cells in our model may be related to cell state switching, it is also possible that the decrease in cellularity and collagen fibril organization and arrest in collagen synthesis from day 14 to day 28 speaks to the limits of the longevity of the culture in the absence of important nutrients or mechanical signals and future studies testing longer time points and additional supplementation with growth factors, cell survival factors, and mechanical conditioning would be valuable.

Another hypothesis that may explain a change in mechanical properties of tissues without a proportional change in total collagen such as days 14 to 28 or in serum-treated versus serum starved conditions, may be due to other changes in the ECM such as collagen crosslinking. This change in crosslinking is supported by reports that show cellular proliferation via serum stimulation is inversely correlated with lysyl oxidase (LOX) expression and stability, which is controlled at both the transcriptional and post-transcriptional level.[29, 30] Therefore, the removal of serum may result in increased lysyl oxidase expression and stability. Interestingly, pro-fibrotic molecule TGF-β1 also enhances LOX and LOXL expression and stability.[31] Thus, crosslinking and not total collagen content may explain the 6.5- and 4.8-fold increase in tissue strength and stiffness we see as a function of 10 ng mL$^{-1}$ TGF-β1 stimulation versus inhibition with 10 μm SB431542 at day 7. Excitingly, this tissue stiffening response is a hallmark clinical diagnostic feature of fibrotic disease progression and is supported by a recent study showing that changes in the stiffness of lung explants from healthy patients versus patients with idiopathic pulmonary fibrosis were dependent on dysregulation of posttranslational collagen crosslinking, not total collagen content and that inhibition of LOX and LOXL in an in vitro model of fibrosis reduced collagen crosslinks and tissue stiffness.[32] It is also possible that changes in the synthesis and modification of ECM proteins other than collagen may affect tissue mechanics and in future studies we plan to more comprehensively assess changes in matrisome proteins using proteomic mass spectrometry similar to Merl-Pham et al.[33]

In addition to using this model to investigate the effects of relevant biomolecules or drugs on ECM synthesis and tissue mechanics, we believe this model could be adapted to investigate the effects of specific gene mutations on ECM synthesis, organization, and mechanics relevant to connective tissue diseases like Marfan Syndrome or Loeys-Dietz syndrome whose pathophysiology is directly related to deregulated TGF-β signaling and subsequent changes in tissue mechanics that result in mechanical failure but which the exact spatiotemporal regulation of TGF β signaling is still largely unknown. Moreover, the relationship between gene variant and benign versus pathogenic phenotype for many of these diseases has not been fully characterized causing difficulties with clinical diagnosis and patient treatment strategy.[34] Controlling for variables like age, sex, and passage number, in the future we plan to apply conditional gene knockout and reconstitution to explore how specific mutations, such as in COL1A1 for Osteogenesis Imperfecta, or FBN1 for Marfan Syndrome, result in quantitative and qualitative changes in collagen synthesis and tissue mechanics in our model.[35]

Another feature of cell-based in vitro models of ligaments and tendons is that they are generally far weaker mechanically than native tissues. Because our tissue histology showed features of connective tissue architecture like uniaxial cell alignment, collagen synthesis, and collagen crimping, we quantified how these changes in architecture were reflected in tissue mechanics due to their functional capacity to resist and transmit tensile forces and compared to in vivo tissue mechanics. While native ligament mechanics range 1-2 orders of magnitude based on anatomical location and function, peritoneal or suspensory ligaments like the uterosacral ligament, have a stiffness ranging from 14.1±1.4 MPa which is well within the range of our 50:50 media group tissue constructs by 14 days of maturation which had a stiffness of 18.2±4.57 MPa.[36] Although articular ligaments typically have higher mechanical properties, the dorsal intercarpal and dorsal radiocarpal of the wrist have stiffnesses reported from 29.34+12.1 and 46.0±16.1 MPa, respectively which, excitingly, is comparable to the strongest experimental group reported here, the day 28 50:50 tissue constructs, which had a stiffness of 27.8±10.8 MPa.[37] However, there are ligaments with stiffnesses on the order of 100s of MPa like the anterior cruciate ligament (ACL) of the knee[38] and in future studies, it would be interesting to test additional strategies that simulate skeletal motion like mechanical conditioning to further increase tissue mechanics.[8] There is an acute need for engineered tissue models that are predictive of human health and disease. With respect to connective tissue dysregulation and disease, in vitro models need to recapitulate the matrix-rich anisotropic architecture of these tissues in order to mirror their mechanical phenotype which is a direct measure of their function. While there remain significant challenges towards generating purely cell-based engineered tissues with mechanical properties and architecture that resemble mature anisotropic collagen-rich tissues, here we presented a relatively straightforward approach that enables the direct assessment of structure-function relationships in response to targeted biological perturbation in a lab grown connective tissue model. Although future studies are necessary to further characterize model longevity and how mechanical conditioning may affect tissue maturation, we believe this in vitro human connective tissue model may be useful to others interested in investigating the role of mechano-transduction pathways, media composition, growth factors, or drugs on cell-mediated synthesis and alignment of ECM and how changes in 3D ECM composition and architecture alter tissue mechanics and function such as in diseases like fibrosis.

In some embodiments, the present technology provides a method for quantifying changes in 3D extracellular matrix (ECM) mechanics and organization by providing a method free of external forces, scaffolding material, and anchoring material that would otherwise interfere (e.g., cell-scaffold biophysical crosstalk) with the signal to be measured.

The present invention, in one of its broadest embodiments, provides a method for quantifying changes in 3D extracellular matrix (ECM) mechanics and organization, the method comprising the steps of: (1) obtaining a non-adhesive cell culture well including a peg disposed in the well operative to develop cellular alignment around the peg; (2) seeding the culture well with a culture medium and anchorage-dependent cells capable of synthesizing ECM components; (3) cultivating the cells, optionally in the presence of one or more test conditions, whereby the cells adhere to one another, exert cytoskeleton-mediated tension and/or cell-driven self-assembly to form a 3D ring-shaped geometry tissue ECM around the peg; and (4) measuring one or more properties of the tissue ECM and/or the cells.

In some embodiments, the cultivating is performed in the absence of an exogenously added scaffolding material and/or a material known to be adhesive for cells or operative as an anchoring material. According to some aspects, the cultivating is performed without application of an externally applied force.

In some embodiments, the method is operative to effect a quantitative change in one or more properties of the tissue ECM and/or the cells due to a presence, absence, and/or a difference in amount/magnitude of the one or more test conditions; wherein the quantitative change is proportional to the one or more test conditions.

In some embodiments, the cellular alignment is directed by cell-derived forces, cell-mediated tension, and/or circumferential cellular alignment around the peg.

In some embodiments, the methods described above can further comprise the step of: (a) removing the tissue ECM and/or the cells from the culture well; and can be executed wherein step (a) is performed after step (3) but before step (4); or wherein step (a) is performed after step (4).

In some embodiments, the measuring comprises observations with or without aid of instrumentation; measurement of structure-function relationships; measurement of geometry of ECM, size of ECM, alignment of ECM, spatial distribution of cells and/or of ECM; instantaneous relaxation of ECM after removal from the culture well; ECM or collagen crimping behavior; quantification using a minimum cross-sectional area or a mean cross-sectional area; measurement of ECM or collagen content per cell; measurement of histology, multiphoton second-harmonic generation, electron microscopy, and/or serial block-face scanning electron microscopy; measurement of mechanical testing, tensile strength, maximum tangent modulus, stiffness, failure strain, thickness measurement (x-y), and/or length measurement (z); measurement of circumferentially-aligned fibrillar ECM or collagen; video, imaging, and/or microscopy; pepsin-acid soluble collagen fraction; measurement of tissue homeostasis and/or dysregulation; hematoxylin and eosin staining, or Masson's trichrome staining; measurement of a degree of crosslinking; measurement including a simulation of motion; measurement of cell-derived changes, changes in synthesis, organization, alignment, and/or mechanics of the ECM; fatigue testing; measurement of one or more secreted soluble factors in the culture medium; measurement of proteomics; measurement of genomics; or a combination thereof.

In some embodiments, the test condition comprises an aging condition, mechano-transduction pathways, genotype and/or phenotype differences, addition of nucleic acids or amino acids, presence of an additional cell type, presence of a virus and/or prion, difference in medium composition, difference in concentration of one or more factors, growth factors, drugs affecting cell-mediated synthesis, one or more biological perturbations, fetal bovine serum, ROCK-Inhibitor, TGF-β1 inhibitor, an interleukin, a nutrient formulation, electromagnetic radiation, particle bombardment, gravitational force, oxygen and/or gas level, a cytokine, temperature, mechanical conditioning, vibration or motion, pressure or vacuum, time, differences in cell origin(s), gene mutations affecting ECM synthesis, organization, and/or mechanics relevant to connective tissue diseases, or a combination thereof.

According to some aspects, the one or more properties of the tissue ECM (experimental) are compared to a tissue ECM cultivated without a presence of the test condition, a native tissue ECM, or a tissue ECM cultivated in vivo (control); and wherein the comparison is operative to provide a dose (factor) response including the control and the experimental.

In some embodiments, the methods are performed wherein the medium is serum-free. In some embodiments, the culture well and/or the peg comprises a hydrogel. In some embodiments, the well and/or the peg comprises non-adhesive agarose.

In some embodiments, the absence of a scaffolding material and/or an externally applied force is operative to provide no cell-scaffold biophysical crosstalk and/or cell-external force biophysical crosstalk.

According to some aspects, the technology provides a method of investigating, diagnosing, and/or treating a disease or condition comprising any of the methods disclosed above. A method of investigating or diagnosing fibrosis, Marfan Syndrome, Loeys-Dietz syndrome, a deregulated TGF-β signaling, cancer, changes in tissue mechanics, tissue mechanical failure, Ehlers-Danlos syndrome, or Osteogenesis Imperfecta can comprise the methods disclosed herein. The method can optionally include investigating or diagnosing a method of treating.

In some embodiments, a quantitative screening method for therapeutic agents or a method for evaluating the efficacy or toxicity of a therapeutic agent candidate substance acting on cells or tissues comprising the methods disclosed above.

In some embodiments, a method of culturing cells, ECM, or tissues, comprising the methods disclosed herein is provided, with the proviso that the methods can be performed with or without the test condition.

In some embodiments, the methods can be wherein the cells comprise or are derived from neonate male foreskin, dermis, tendon, lung, umbilical cords, cartilage, urethra, corneal stroma, oral mucosa, intestine, bone marrow, placenta, amnion, muscle, adipose, bone; or wherein the ECM producing cells comprise human dermal fibroblasts or human umbilical cord perivascular cells. fibroblasts, stromal cells, mesenchymal stem cells, transfected cells, recombinant cells, genetically engineered cells, normal cells, immune cells such as macrophages, eosinophils, or a combination thereof. In some embodiments, the culture medium comprises spheroids including cells, monodispersed cells, or a combination thereof.

In some embodiments, the cell culture well can include cells suitable for cultivation upon initially obtaining the well. It is contemplated that any of the steps can be combined with other steps. For example, the seeding and cultivation can be performed in a single step. In another example, the well is obtained pre-seeded. In yet another example, the measuring is performed at another location compared to the cultivating. The methods disclosed herein can be provided in the form of a kit with instructions for use. In some embodiments, the instructions can provide at least a portion of one or more methods disclosed herein.

Unless otherwise defined herein, scientific and technical terms used in connection with the present application shall have the meanings that are commonly understood by those of ordinary skill in the art to which this disclosure belongs. It should be understood that this invention is not limited to the particular methodology, protocols, and reagents, etc., described herein and as such can vary. The terminology used herein is for the purpose of describing particular embodiments only and is not intended to limit the scope of the present invention, which is defined solely by the claims. Definitions of common terms in immunology and molecular biology can be found in The Merck Manual of Diagnosis and Therapy;[39] The Encyclopedia of Molecular Cell Biology and Molecular Medicine;[40] Molecular Biology and Biotechnology: a Comprehensive Desk Reference;[41] Immunology;[42] Janeway's Immunobiology;[43] Lewin's Genes XI;[44] Molecular Cloning: A Laboratory Manual.;[45] Basic Methods in Molecular Biology;[46] Laboratory Methods in Enzymology;[47] Current Protocols in Molecular Biology (CPMB);[48] Current Protocols in Protein Science (CPPS);[49] and Current Protocols in Immunology (CPI).[50]

In some embodiments of any of the aspects, the disclosure described herein does not concern a process for cloning human beings, processes for modifying the germ line genetic identity of human beings, uses of human embryos for industrial or commercial purposes or processes for modifying the genetic identity of animals which are likely to cause them suffering without any substantial medical benefit to man or animal, and also animals resulting from such processes.

The description of embodiments of the disclosure is not intended to be exhaustive or to limit the disclosure to the precise form disclosed. While specific embodiments of, and examples for, the disclosure are described herein for illustrative purposes, various equivalent modifications are possible within the scope of the disclosure, as those skilled in the relevant art will recognize. For example, while method steps or functions are presented in a given order, alternative embodiments may perform functions in a different order, or functions may be performed substantially concurrently. The teachings of the disclosure provided herein can be applied to other procedures or methods as appropriate. The various embodiments described herein can be combined to provide further embodiments. Aspects of the disclosure can be modified, if necessary, to employ the compositions, functions and concepts of the above references and application to provide yet further embodiments of the disclosure. Moreover, due to biological functional equivalency considerations, some changes can be made in protein structure without affecting the biological or chemical action in kind or amount. These and other changes can be made to the disclosure in light of the detailed description. All such modifications are intended to be included within the scope of the appended claims.

Specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

The technology described herein is further illustrated by the following examples which in no way should be construed as being further limiting. Although methods and materials similar or equivalent to those described herein can be used in the practice or testing of this disclosure, suitable methods and materials are described below.

EXAMPLES

The invention now being generally described, it will be more readily understood by reference to the following examples which are included merely for purposes of illustration of certain aspects and embodiments of the present invention and are not intended to limit the invention.

Example 1 Quantitative Effects of Nutrient Composition

Structure: Characterization of Tissue Architecture

To enable the fabrication of ring-shaped tissue constructs with anisotropic tension, molten agarose was added to all wells of a 24-well plate. Then, custom designed stainless-steel inserts were simultaneously placed in each well and the agarose was allowed to solidify. After the stainless-steel inserts were removed, all wells of a 24-well plate were left with a 3D non-adhesive gel with a 5 mm diameter central peg surrounded by a 0.75 mm cylindrical trough in which monodisperse cells could be seeded (FIG. 1A).

Figure 1F:
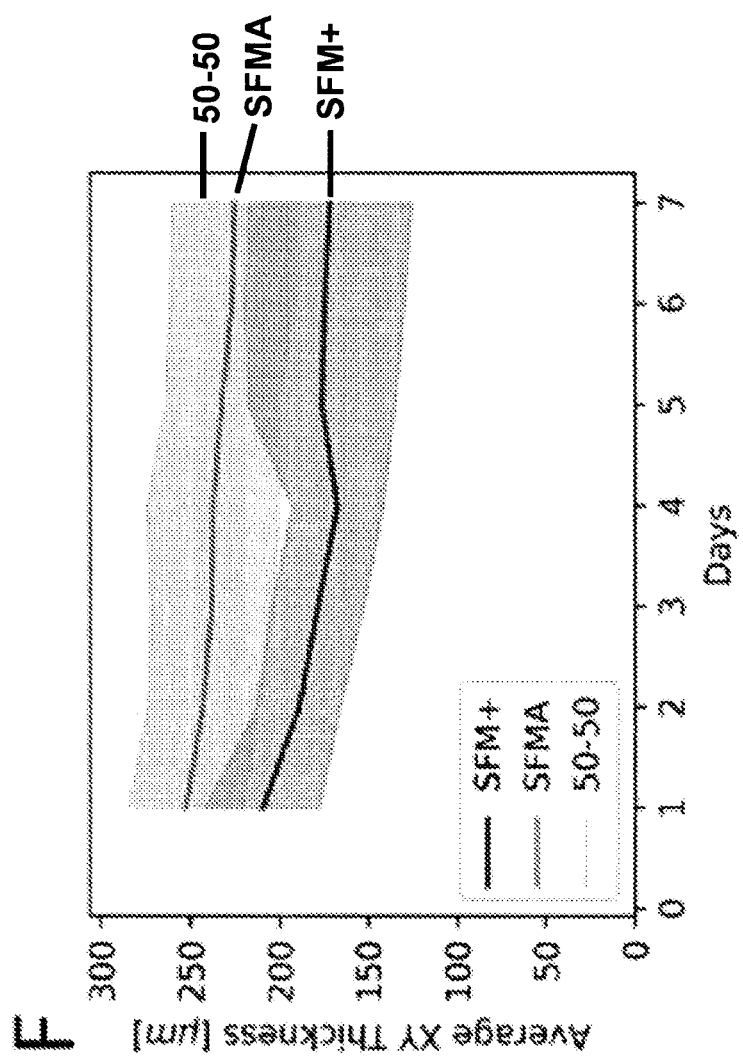
FIG. 1 provides an illustration of a quantitative method for analyzing ECM.
Figure 1H:
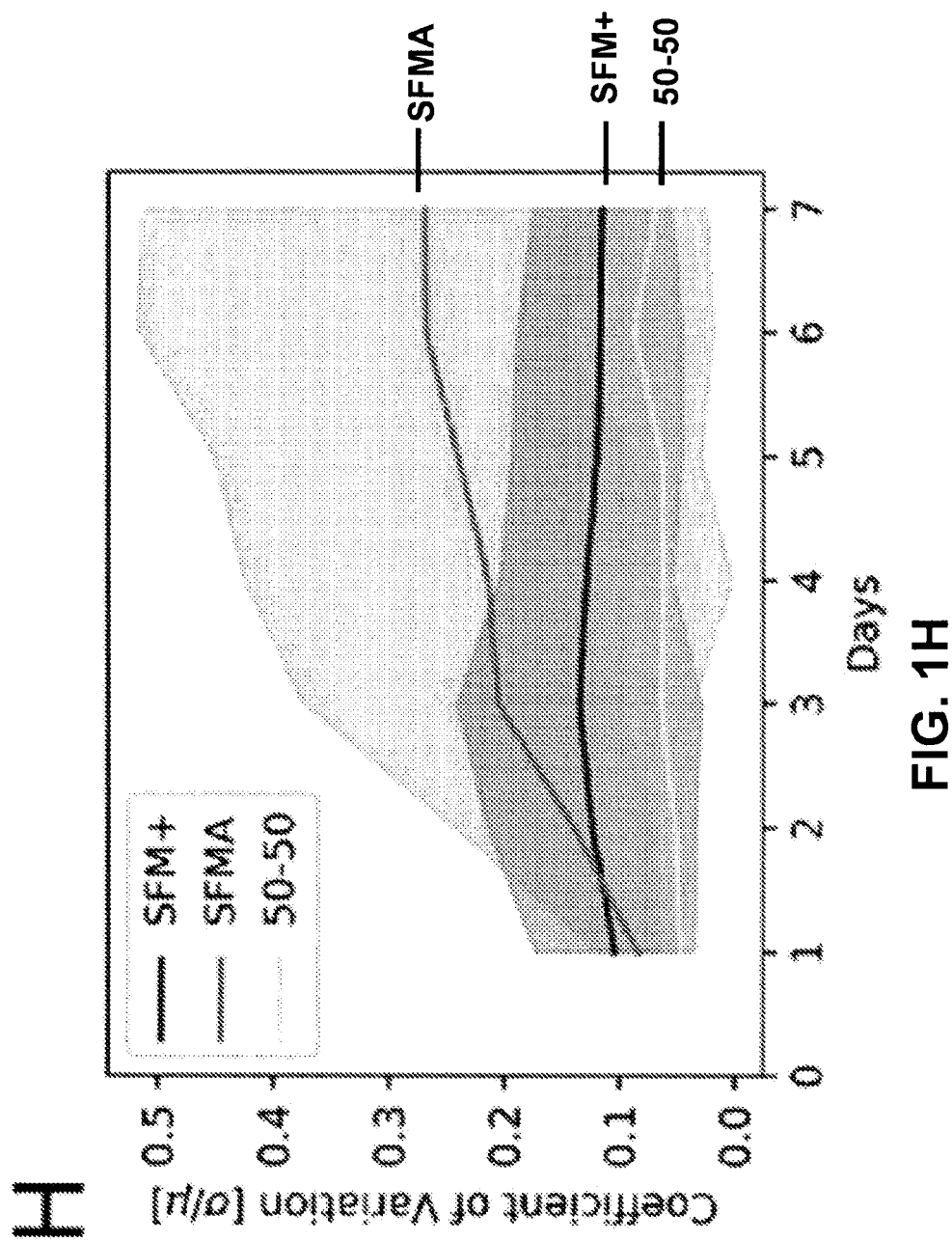

Primary normal human dermal fibroblasts (NHDF) were seeded at $3 \times 10^5$ cells per well in either Dulbecco's Modified Eagle's medium (DMEM) supplemented with 0.1 mM 2-phospho-L-ascorbic acid and 50.0 μg mL$^{-1}$ L-proline (SFM+), advanced DMEM supplemented with 4 mM GlutaMax (SFMA), or a 50:50 mixture of the two (50:50) to investigate the effects of nutrient composition on tissue thickness and morphology as a function of time (FIG. 1B, FIG. 1C, FIG. 1D, FIG. 1E). The x-y thickness of the tissues was measured over time (FIG. 1F, FIG. 1G). Tissues in SFM+(FIG. 1B) and 50:50 (FIG. 1E) maintained a uniform thickness, but tissues in 50:50 were significantly thicker. Conversely, tissues in SFMA developed non-uniform thick and thin regions as a function of time (FIG. 1C, FIG. 1D). This variation in tissue thick uniformity was quantified over 7 days (FIG. 1H). The average x-y thickness (FIG. 1G) and the coefficient of variation of tissue thickness (FIG. 1I) were quantified as a function of media composition and time. Tissues in SFMA and 50:50 were significantly thicker than tissues in SFM+ at day 7 (FIG. 1G, One-way ANOVA with post-hoc Tukey HSD, $p<0.05$). The coefficient of variation of the thickness was significantly higher for SFMA compared to SFM+ and 50:50 media groups (FIG. 1I, One-way ANOVA with post-hoc Tukey HSD, $p<0.05$). Data presented as mean±S.D., n=24. The scale bars=1000, 200 μm. While all media groups showed a slight decrease in x-y tissue thickness over 7 days (FIG. 1F), by day 7, the average thickness of SFM+ tissue constructs was significantly smaller than both SFMA and 50:50 media groups (FIG. 1G, One-way ANOVA with post-hoc Tukey HSD, $p<0.05$). Tissue thickness was uniform for SFM+ and 50:50 media groups, whereas tissues matured in SFMA tended to develop non-uniform regions (FIG. 1C, FIG. 1D). To quantify this variability in thickness, we calculated the coefficient of variation as a function of media composition and time (FIG. 1H).

Figure 1I:
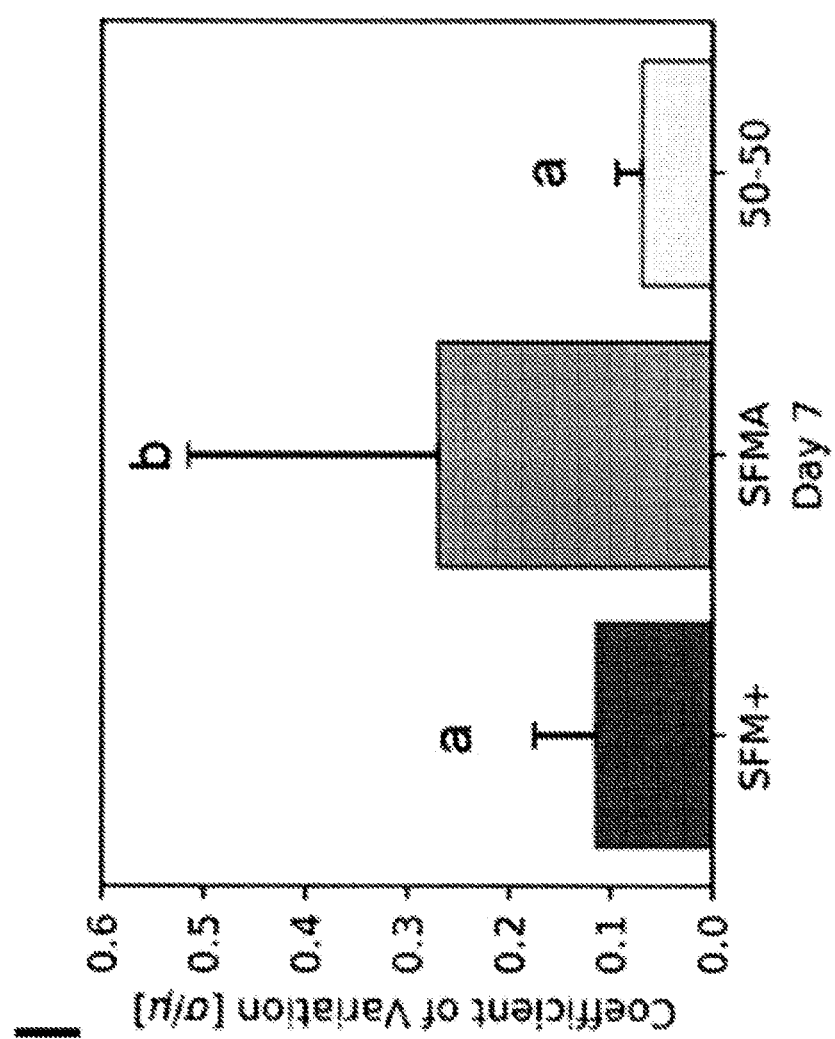

It was observed that the thickness of all media groups was relatively uniform at day 1, but by day 7 the coefficient of variation of tissues cultured in SFMA were significantly higher than SFM+ and 50:50 (FIG. 1I, One-way ANOVA with post-hoc Tukey HSD, $p<0.05$). This suggests that media composition is directly related to the magnitude and variability of tissue thickness, with the 50:50 media formulation preserving x-y thickness and uniformity over 7 days.

The human fibroblasts formed stable 3D ring-shaped tissues constructs whose thickness and uniformity were dependent on the composition of serum-free media. The seeded cells settled and self-assembled into ring-shaped tissue constructs and can then be used for downstream assays like mechanical testing to failure at 7-to-28-day timepoints (e.g., FIG. 1A, right).

Additional investigations, calculations, and experiments were conducted wherein the diameter of the central peg was varied. The experiments included increasing the diameter above 5 mm, and successful culturing of ECM/tissue rings around a peg with a diameter as large as 64 mm was achieved. The diameter could be in the range from about 5 mm to about 65 mm, optionally in the range from about 5 mm to about 60 mm. The practical width of the trough (around the central peg) was also investigated. Using different trough widths, the cells were seeded into the mouth of the trough, and they settled by gravity to the bottom of the trough where they aggregated and self-assembled. Thus, the trough acted like a funnel. The mouth of the trough was wider than the bottom. Looking at a cross section of the trough, it could have different shapes. One side could be near vertical, which is the wall of the central peg. The other side of the trough is not vertical and would be at an angle. An angle steep enough that would allow the cells to settle by gravity or by the assistance of centrifugation to the bottom the trough, likely about a 45-degree angle. The bottom of the trough would be much narrower than the mouth of the trough (a V like shape) so that the cells are funneled together and contact each other, a step critical for aggregation and self-assembly.

Histology Reveals Shift in Alignment and Proportion of Cells to ECM

To determine how changes in bulk tissue morphology were reflected in cell and ECM composition and cell alignment, we performed histology on 1, 7, and 14-day tissue constructs from each media group (FIGS. 1B-E). Day 1 tissues for all media groups were highly cellular and relatively disorganized with rounded cellular morphology as shown by hematoxylin and eosin (H&E) and Masson's trichrome (MT) staining. Over 14 days there was a shift in cellularity characterized by an increase in cellular alignment as well as collagen synthesis and alignment. Similar to gross tissue morphology, the shift in cell alignment and collagen synthesis and organization was media dependent. Over 14 days, collagen staining increased for SFM+ corresponding to a decrease in the proportion of cells to ECM. Masson's trichrome staining of SFMA tissues showed increased staining for collagen over time. Within a single tissue there were regional differences that also showed histological differences. Thin regions were characterized by increased cellular alignment and fibrillar collagen content, whereas thick regions had qualitative differences between the surface and bulk in which cells within the bulk were more rounded, less aligned, and the staining for collagen was more punctate (FIG. 1C, FIG. 1D). High magnification images of thick and thin tissues corroborated region-dependent differences (FIG. 1J, FIG. 1K). Tissue rings seeded with $3\times10^5$ cells that were cultured in SFMA media for 14 days were fixed, embedded and sections stained with Masson's trichrome, and images from thick (FIG. 1J) and thin (FIG. 1K) regions are shown.

The tissues had local variations in collagen and cell morphology as shown in FIG. 1J and FIG. 1K. Tissue rings seeded with $3\times10^5$ cells that were cultured in SFMA media for 14 days were fixed, embedded and sections stained with Masson's trichrome. Shown are images from thick (FIG. 1J) and thin (FIG. 1K) regions (scale bar=20 µm). The outer surface of thicker regions was characterized by cellular elongation and abundant fibrillar collagen aligned in the same direction as cells. Moving inward from the surface, there was a clear transition to a more rounded cellular phenotype and punctate collagen signal in the bulk region of the tissue. In contrast, the thin regions of tissues were characterized by highly aligned cells and abundant fibrillar collagen throughout. This suggests that the gross tissue morphology was directly related to the alignment of cells and synthesis of fibrillar collagen with thinner tissue constructs that have an increased proportion of surface to bulk regions corresponding to increased alignment and collagen.

Example 2 Multiphoton SHG Illuminates Changes in 3D Collagen Density

Figure 2A:
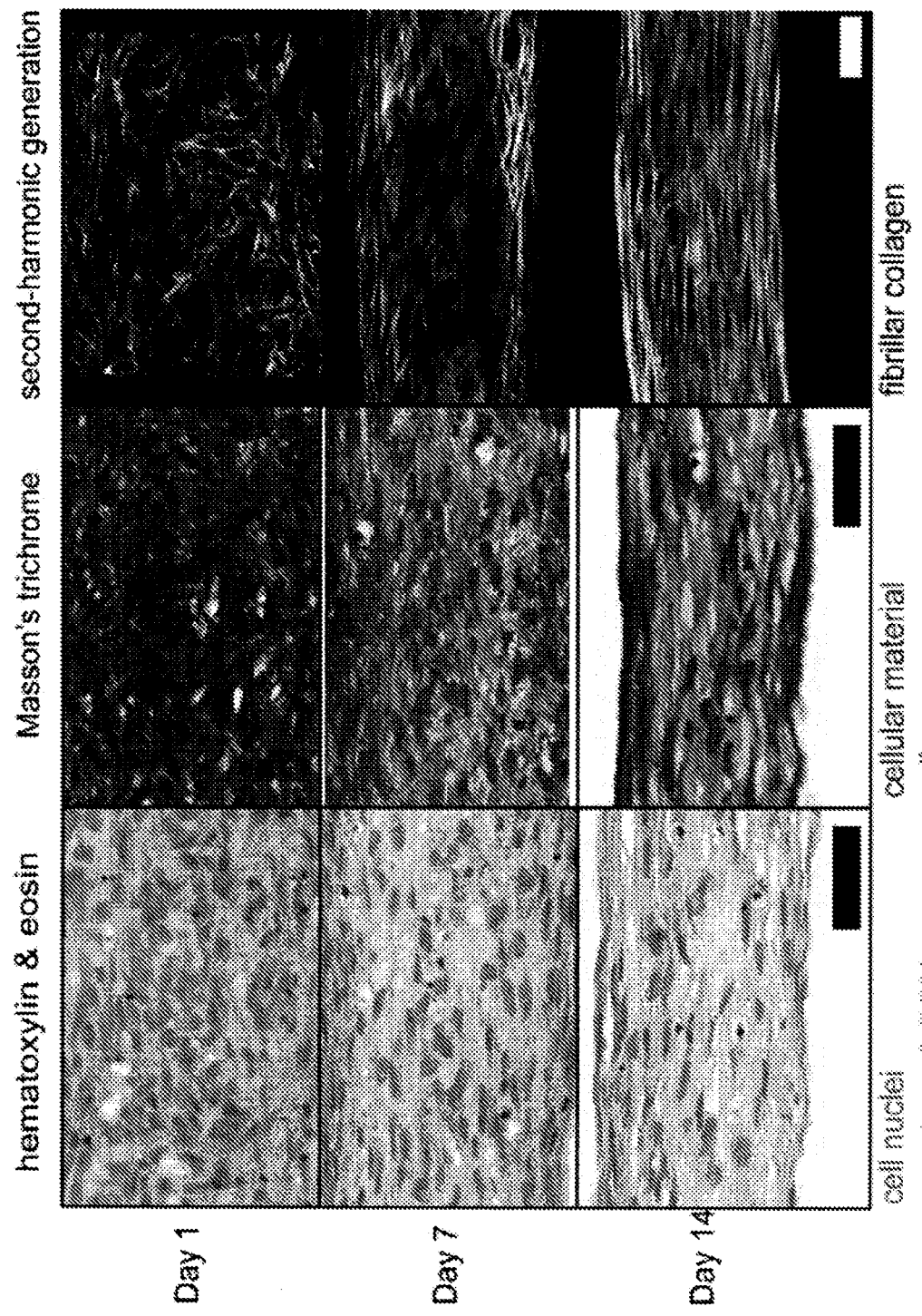
FIG. 2 provides images of multiphoton second-harmonic generation (SHG) microscopy compared the fibrillar collagen SHG signal to histology for tissues grown in 50:50 media over 28 days (FIG. 2A, FIG. 2B). Isometric z-stacks of fibrillar collagen for day 1, 14, and 28-day tissues demonstrated a significant shift in collagen architecture (FIG. 2C). 3D reconstruction of the z-stacks revealed an increase in 3D collagen density and organization, with the most notable differences between day 1 and day 14 (FIG. 2D). SHG zstacks of relaxed tissues exhibited the collagen crimping behavior characteristic of collagen-rich tensile tissues like ligaments and tendons (FIG. 2E). 3D reconstruction of collagen crimping enabled the visualization of 3D crimp topography and were compared to porcine patellar tendon (FIG. 2F).
Figure 2B:
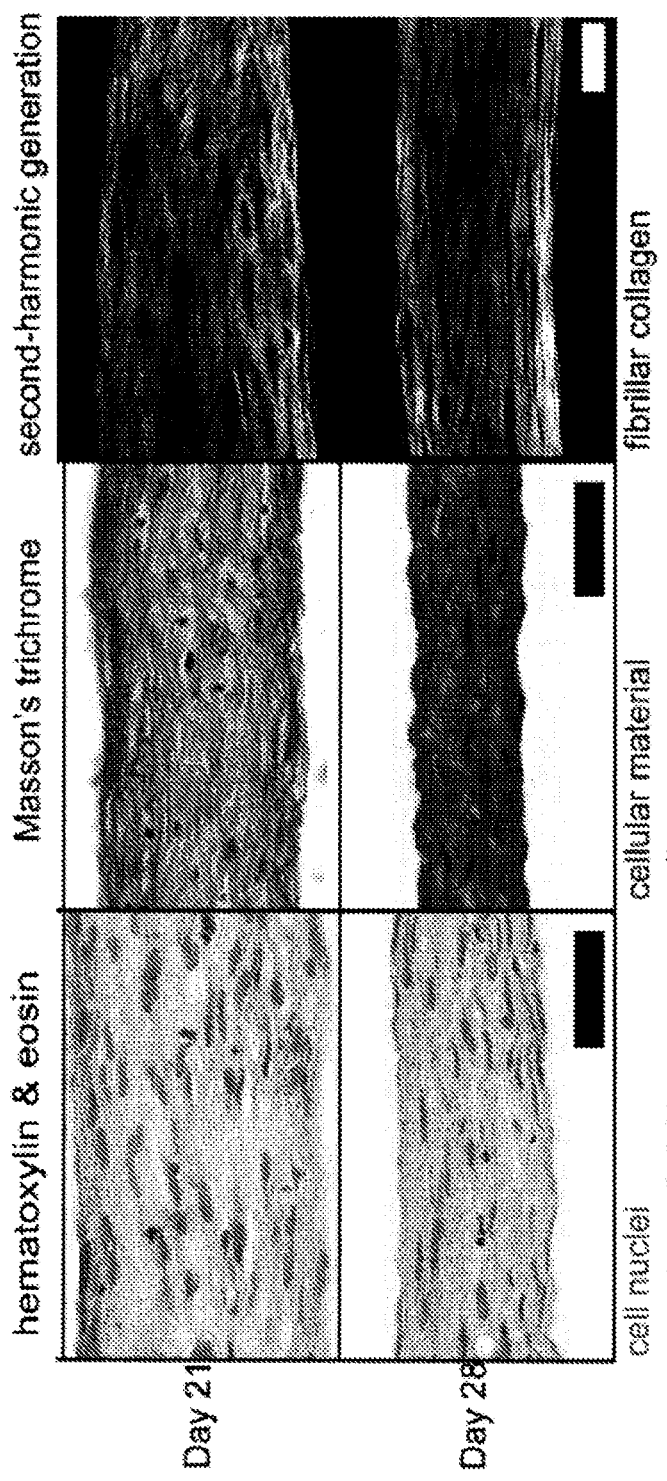
Figure 2C:
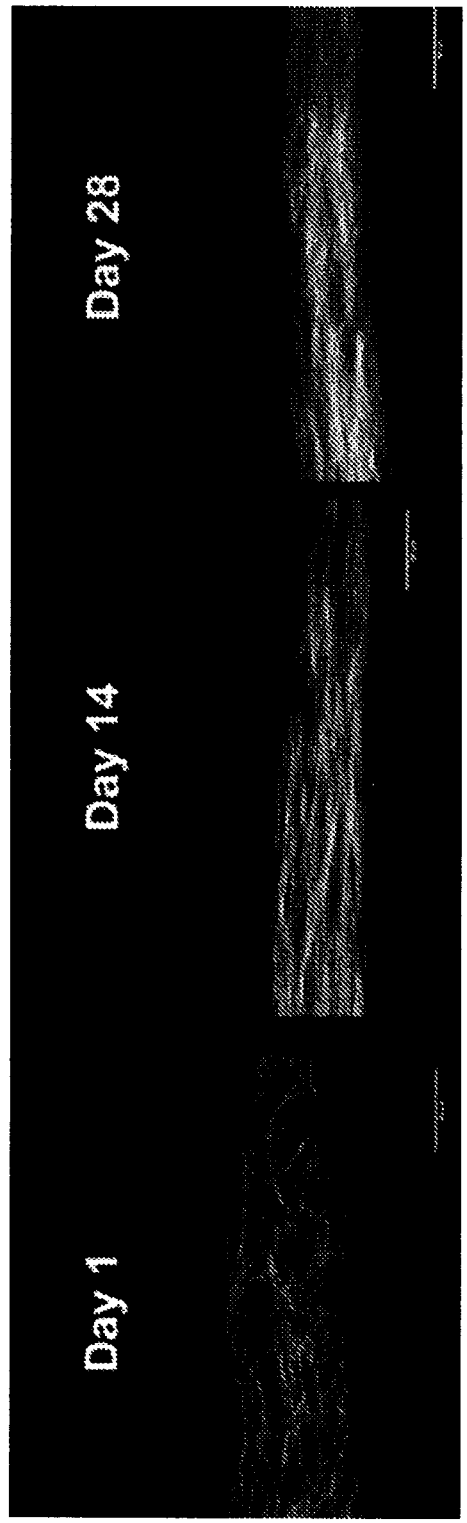
Figure 2D:
Figures 2E, 2F:
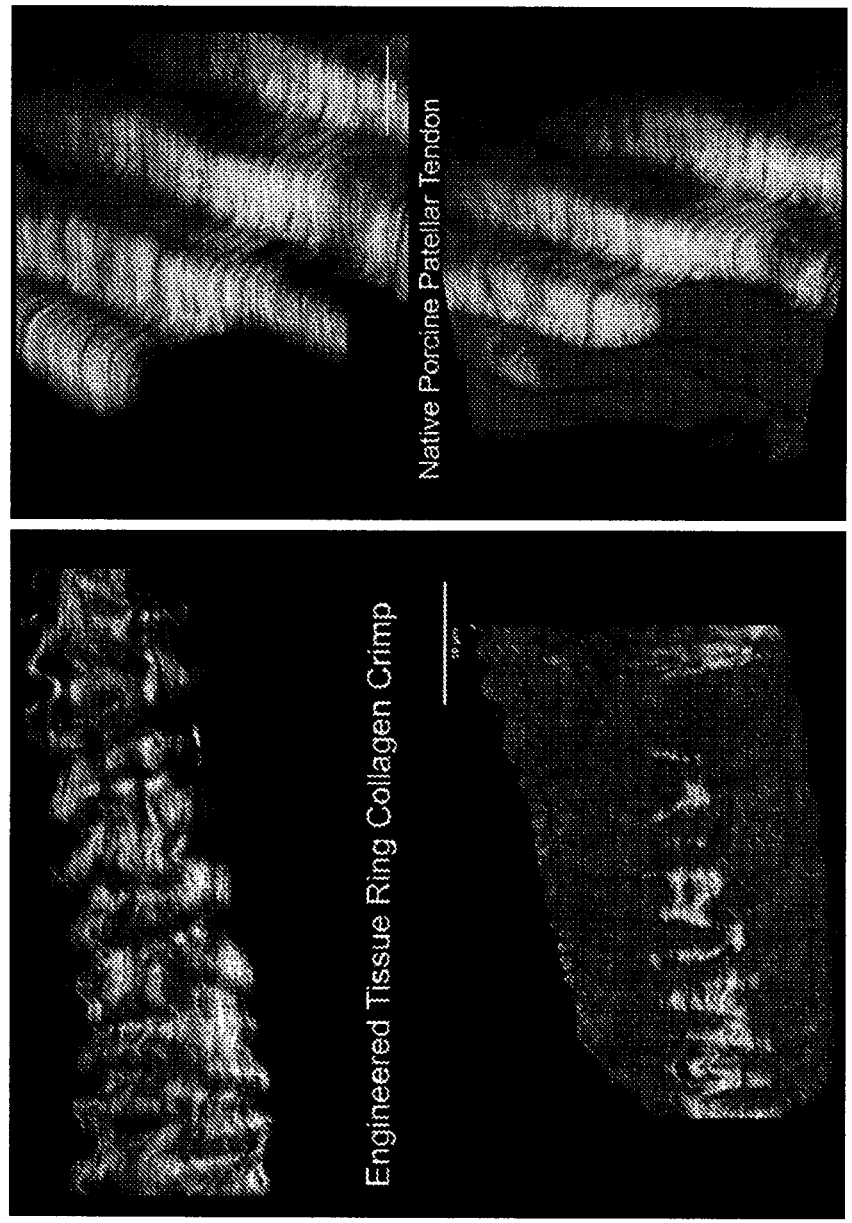

Tissues matured in 50:50 media were characterized by a similar increase in collagen staining over time similar to SFMA, but without the development of non-uniform thick and thin regions. To validate these histological findings and further explore the 3D architecture of fibrillar collagen, we performed multiphoton second-harmonic generation (SHG) microscopy and compared the fibrillar collagen SHG signal to histology for tissues grown in 50:50 media over 28 days (FIG. 2A, FIG. 2B). Isometric z-stacks of fibrillar collagen for day 1, 14, and 28-day tissues demonstrated a significant shift in collagen architecture (FIG. 2C). Collagen was relatively sparse and disorganized at day 1, whereas z-stacks at day 14 revealed circumferentially aligned fibrillar collagen. 3D reconstruction of the z-stacks revealed an increase in 3D collagen density and organization, with the most notable differences between day 1 and day 14 (FIG. 2D). To confirm that tissues had developed cell-mediated tension, rings matured for 28 days were carefully removed from the circular agarose wells using forceps and transferred to fixative to capture the instantaneous relaxation. SHG zstacks of relaxed tissues exhibited the collagen crimping behavior characteristic of collagen-rich tensile tissues like ligaments and tendons (FIG. 2E). 3D reconstruction of collagen crimping enabled the visualization of 3D crimp topography and were compared to porcine patellar tendon (FIG. 2F).

In FIG. 2A and FIG. 2B (scale bars=100 µm), tissue construct histology and SHG suggest an inverse relationship between cellularity and collagen content over time. Tissues cultured in 50:50 media were examined by histology (H&E and Mason's trichrome) and multiphoton second-harmonic generation (SHG) microscopy at days 1, 7, 14, 21 and 28. In the first 14 days, there was a decrease in cellularity over time paired with an increase in cell alignment and collagen density. This shift in cellularity and cellular alignment continued through 28 days with cells increasingly elongated in the same direction as synthesized collagen.

Electron Microscopy Shows Nanoscale Architectural Changes

While histology and SHG can visualize changes in cell and ECM composition and organization, they cannot resolve changes in individual collagen fibril synthesis and organization. To better understand the changes in cellularity and collagen synthesis at near nanoscale resolution, we performed transmission electron microscopy and serial block-face scanning electron microscopy (FIGS. 3E-3J). Cells appeared rounded and in direct contact with one another at 4 h in low magnification electron micrographs. This was also supported by brightfield and SHG images of tissue constructs acquired 4 h after seeding that showed a rounded cell morphology and no fibrillar collagen (FIG. 3A, scale bar=1000 µm), (FIG. 3B, FIG. 3C, FIG. 3D, scale bars=50 µm). Using the transmission electron microscopy and serial block-face scanning electron microscopy, by day 1, there was a qualitative increase in cellular organization particularly near the surface of the tissues and similarly high density of cells with the appearance of some collagen fibrils (FIG. 3E, FIG. 3H). Day 14 tissues were characterized by a significant increase in collagen fibrils with individual cells enmeshed in newly secreted collagen and a decrease in the density of cells (FIG. 3F, FIG. 3I). Cells maintained contacts between neighbors with long projections that could be seen interspersed between collagen fibrils. Some cells displayed indications of autophagic and apoptotic processes with the appearance of lysosomal vacuoles and nuclear degradation. Interestingly, by day 28 collagen fibrils were less packed and there were increased collagen fibrils out of plane suggesting a decrease in organization as well as a decrease in cellularity (FIG. 3G, FIG. 3J).

FIGS. 3E-3J demonstrated human tissue rings secrete de novo collagen fibrils over time. Tissues cultured for 1, 14 and 28 days in 50:50 media were fixed, embedded and tissue cross-sections were examined by serial block-face (SBF) scanning electron microscopy (SEM) (FIGS. 3E, 3F, 3G) and transmission electron microscopy (TEM) (FIGS. 3H, 3I, 3J). These images confirm a shift from purely cellular aggregates to highly aligned, collagen-rich ring-shaped tissue constructs over a period of 28 days in culture. At day 1, constructs were mostly cellular with the appearance of collagen fibrils beginning in the extracellular space (FIG. 3H). Day 14 revealed a shift in cellularity with individual cells clearly enmeshed in cell-synthesized collagen and intercellular contacts maintained via long projections (FIG. 3I). Present are some autophagic and apoptotic cell features such as lysosomal vacuoles and nuclear degradation (FIG. 3E, FIG. 3F, FIG. 3G). By day 28, collagen fibrils appeared more separated from one another and increasing numbers of fibrils were out of plane suggesting less organization along with a continued decrease in cellularity (FIG. 3J). White stars indicate cell nuclei. White arrows indicate collagen fibrils. White circle highlights fibripositor. Scale bars=500 µm (FIGS. 3E-3G), 200 nm (FIGS. 3H-3J).

Example 3 Tissue Mechanics Corroborate Media and Time Dependent Changes

Figure 4A:
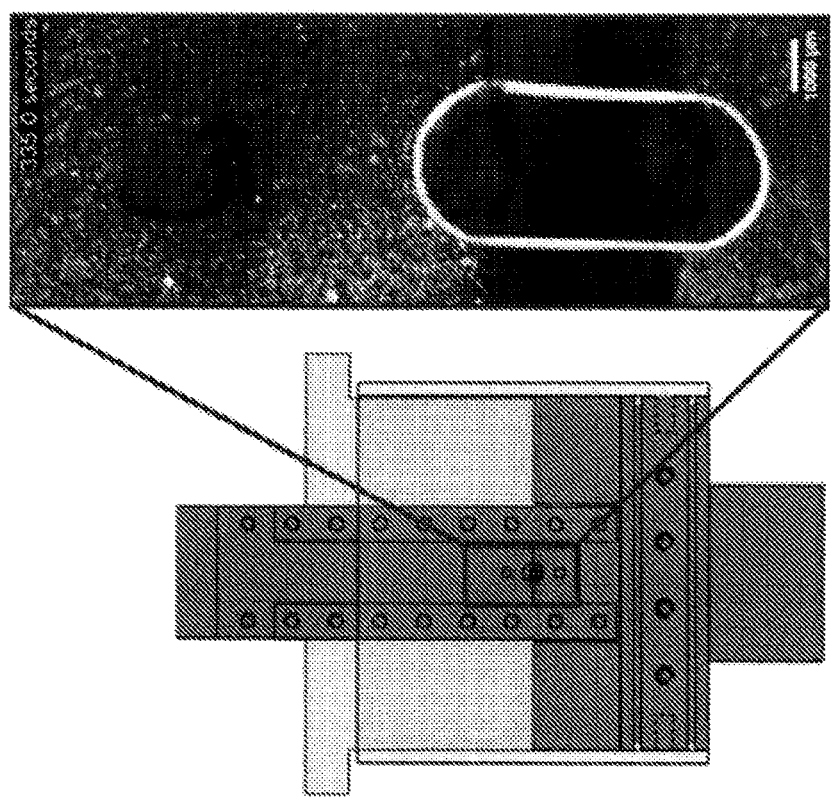
FIG. 4 provides examples of data used to quantify how changes at the cellular and molecular level affected mechanical properties. Mechanical testing was performed with custom grippers and a heated aqueous enclosure, which were fabricated to enable tensile testing of tissue constructs in 37° C. phosphate-buffered saline (PBS) on an Instron equipped with a 5N load cell (FIG. 4A). Load-displacement curves and the cross sectional area of tissues were used to determine the stress-strain relationship as a function of media composition and maturation time (FIG. 4B). The stress-strain curves exhibited time and media composition dependent responses that aligned with the histological changes in tissue morphology, composition, and organization (FIG. 4C). While the stiffness and collagen content of 50:50 and SFMA tissue constructs were relatively consistent, by day 28, the ultimate tensile strength and maximum tangent modulus of 50:50 tissue constructs (4.81±2.10, 27.8±10.8 MPa) were significantly greater than SFMA (2.82±1.38, 19.8±6.84 MPa) and SFM±(0.88±0.50, 5.50±1.91 MPa) (FIG. 4D-FIG. 4F Kruskal-Wallis, with posthoc Conover, $p<0.05$). SFM±tissues had significantly less collagen synthesis per cell compared to SFMA and 50:50 at every time point, indicating the relationship between tissue ECM composition and mechanical properties. Although many groups report engineering stress-strain equations for biomechanics studies, these equations are only valid for small deformations, which is often not the case for soft tissues. Similarly, SFMA tissues exhibited high levels of variability in the cross-sectional area which may affect mechanical calculations. To address this concern, we quantified true stress-strain as well as performed all quantification using the minimum cross-sectional area as well as the mean cross-sectional area (FIG. 4G, FIG. 4H).
Figure 4B:
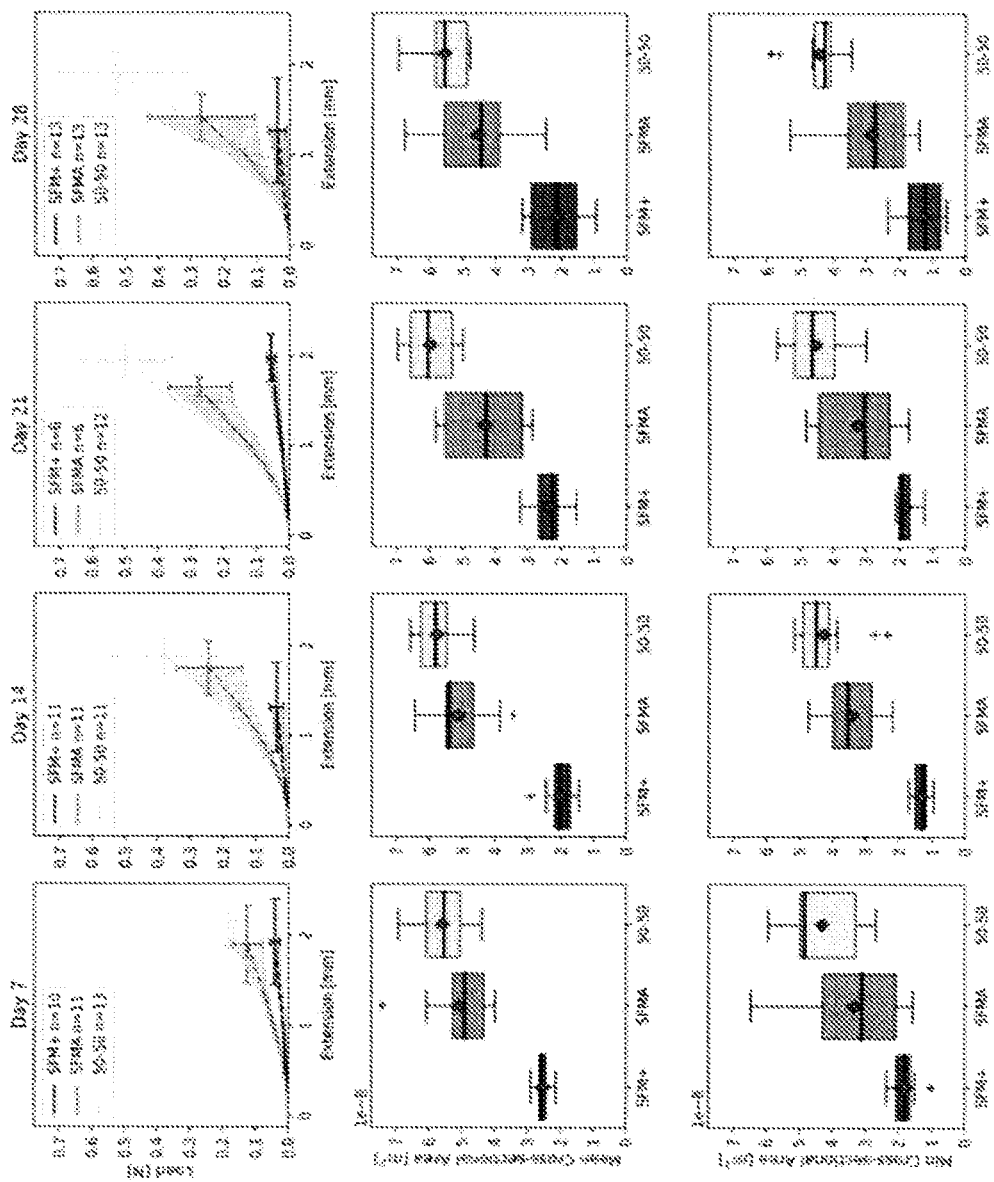
Figure 4E:
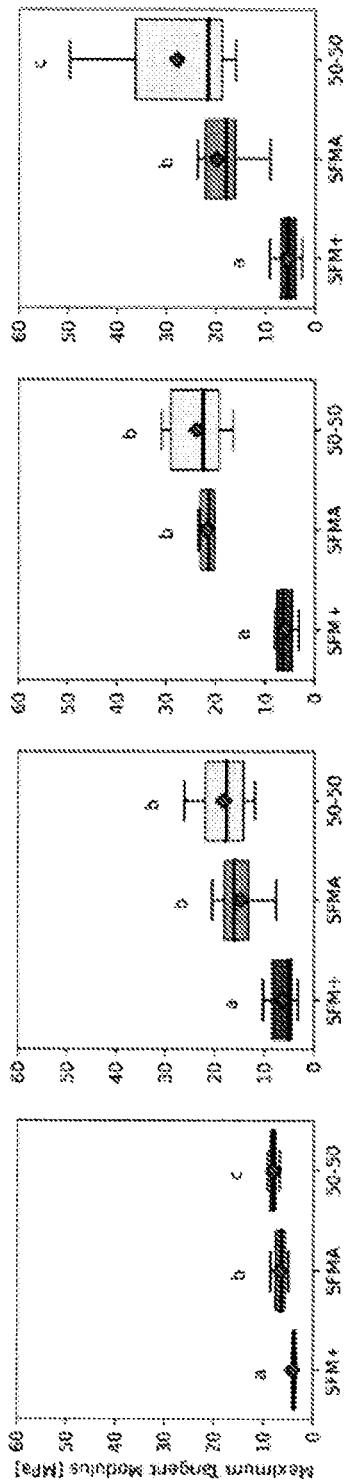
Figure 4F:
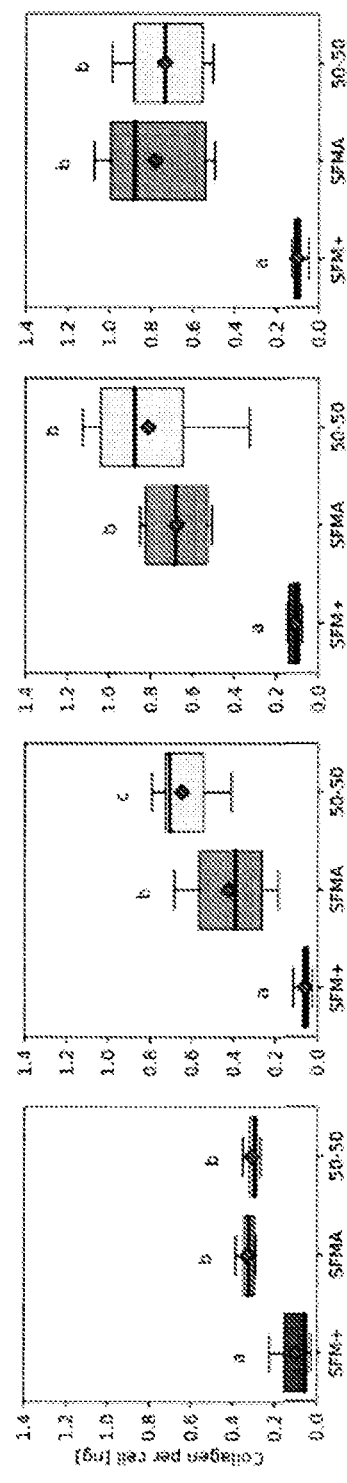
Figure 4G:
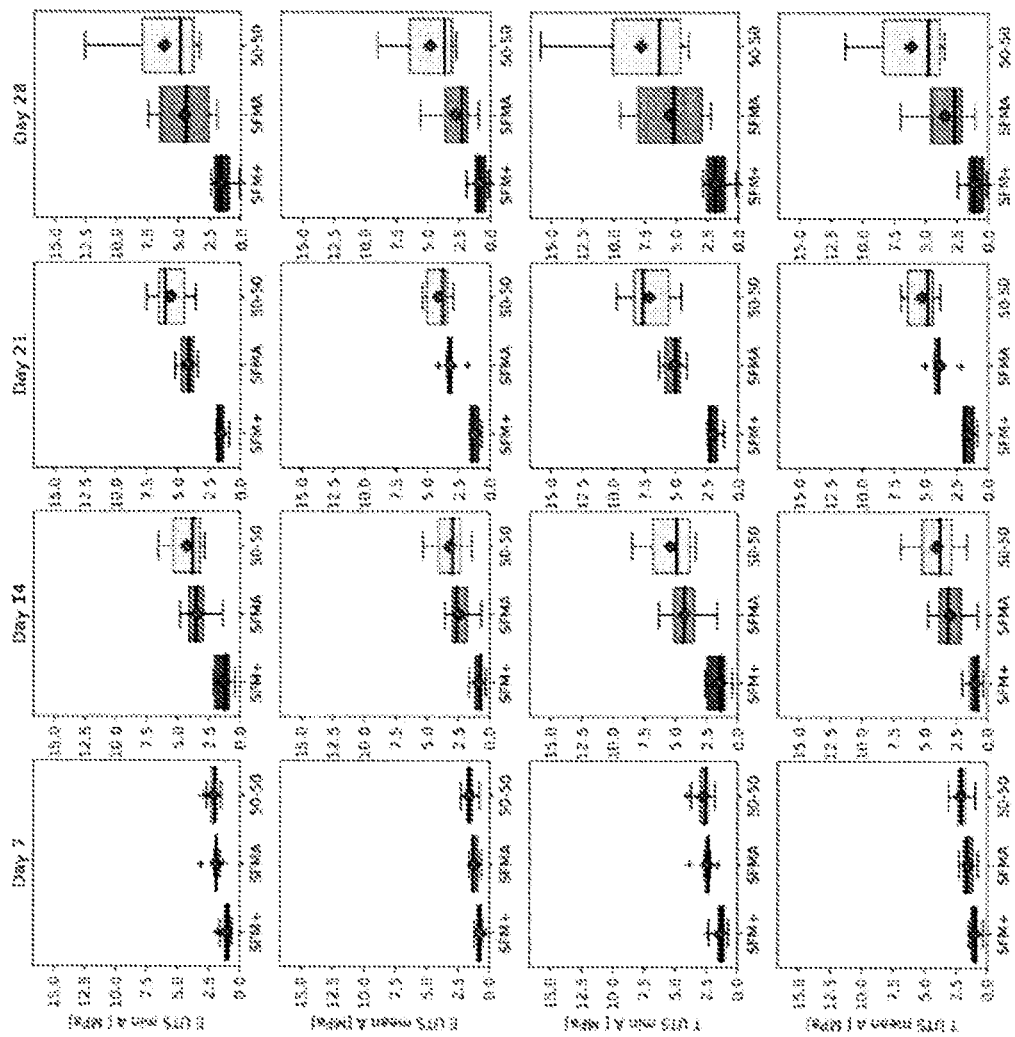
Figure 4H:
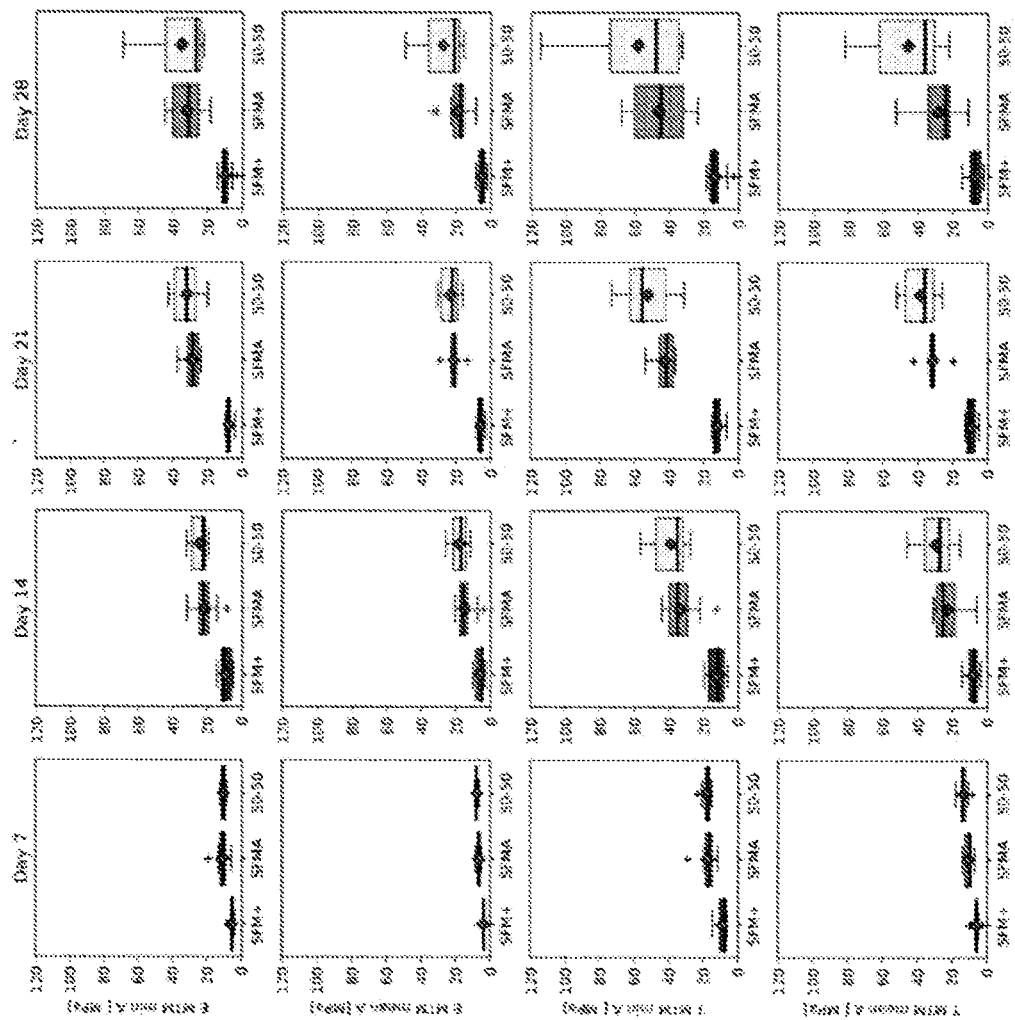

To quantify how changes at the cellular and molecular level affected mechanical properties, we performed mechanical testing to understand the relationship between tissue architecture, tensile properties, and collagen content. Custom grippers and a heated aqueous enclosure were fabricated to enable tensile testing of tissue constructs in 37° C. phosphate-buffered saline (PBS) on an Instron equipped with a 5N load cell (FIG. 4A). Load-displacement curves and the crosssectional area of tissues were used to determine the stress-strain relationship as a function of media composition and maturation time (FIG. 4B). The stress-strain curves exhibited time and media composition dependent responses that aligned with the histological changes in tissue morphology, composition, and organization (FIG. 4C). While the stiffness and collagen content of 50:50 and SFMA tissue constructs were relatively consistent, by day 28, the ultimate tensile strength and maximum tangent modulus of 50:50 tissue constructs (4.81±2.10, 27.8±10.8 MPa) were significantly greater than SFMA (2.82±1.38, 19.8±6.84 MPa) and SFM+(0.88 0.50, 5.50±1.91 MPa) (FIG. 4D, FIG. 4E, Kruskal-Wallis, with posthoc Conover, p<0.05). SFM+ tissues on the other hand were significantly weaker than both SFMA and 50:50 for all time points. Similarly, SFM+ tissues also had significantly less collagen synthesis per cell compared to SFMA and 50:50 at every time point, indicating the relationship between tissue ECM composition and mechanical properties (FIG. 4D-FIG. 4F, KruskalWallis withposthoc Conover, p<0.05). Although many groups report engineering stress-strain equations for biomechanics studies, these equations are only valid for small deformations which is often not the case for soft tissues. Similarly, SFMA tissues exhibited high levels of variability in the cross-sectional area which may affect mechanical calculations. To address this concern, we quantified true stress-strain as well as performed all quantification using the minimum cross-sectional area as well as the mean cross-sectional area (FIG. 4G, FIG. 4H).

The mechanical properties and total collagen of tissue rings increased over time and is dependent on the composition of the serum-free media. Tissue rings cultured for 7, 14, 21, and 28 days in SFM+, SFMA or 50:50 media were removed from the molds and subjected to tensile testing and analyzed for total collagen. Tissue constructs exhibited media and time dependent mechanical properties (FIG. 4C) that scaled with total collagen content (FIG. 4F). At all the time points, tissue strength (FIG. 4D), stiffness (FIG. 4E), and collagen content (FIG. 4F) were significantly greater in 50:50 and SFMA tissues compared to SFM+ corroborating the differences visualized in tissue architecture via histology, SHG, and electron microscopy (Kruskal-Wallis with post-hoc Conover, p<0.05). While the stiffness and collagen content of 50:50 and SFMA tissue constructs were relatively consistent, by day 28, the ultimate tensile strength and maximum tangent modulus of 50:50 tissue constructs (4.81±2.10, 27.8±10.8 MPa) were significantly greater than SFMA (2.82±1.38, 19.8 6.84 MPa) and SFM+(0.88±0.50, 5.50±1.91 MPa) (D-E, Kruskal-Wallis with post-hoc Conover, p<0.05).

Mechanics Depend on Initial Cell Number and Maturation Time

Figure 5A:
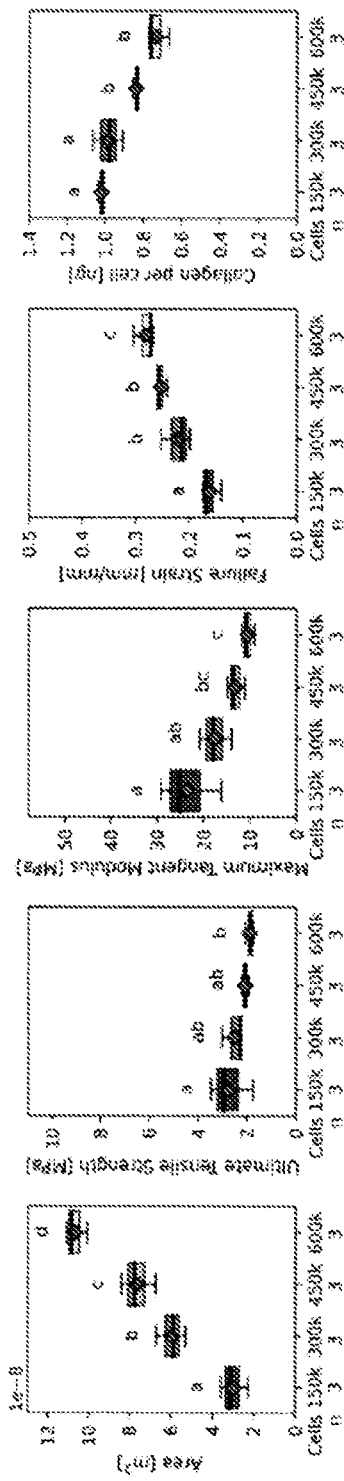
FIG. 5 provides further investigation of the relationship between cell seeding number and maturation time for the 50:50 media group. Stiffness, strength, and collagen synthesis per cell had a significant inverse relationship with cell seeding density (FIG. 5A, Kruskal-Wallis with post-hoc Conover, $p<0.05$). The 50:50 media group seeded at $3\times10^5$ cells had no significant changes in cross-sectional area from 7 to 28 days (FIG. 5B, Kruskal-Wallis with post-hoc Conover, $p<0.05$), there was a significant increase in tissue strength and stiffness over the first 21 days for all time points, but no significant difference between day 21 and 28. We investigated the correlation between time, cross-sectional area, mechanical properties, and collagen content using a Spearman's rank correlation matrix (FIG. 5C).
Figure 5B:
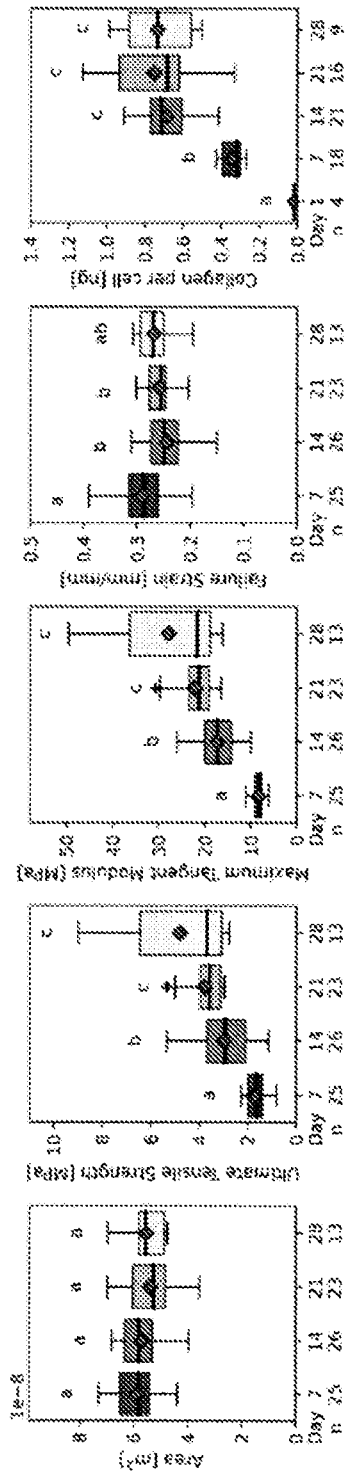
Figure 5C:
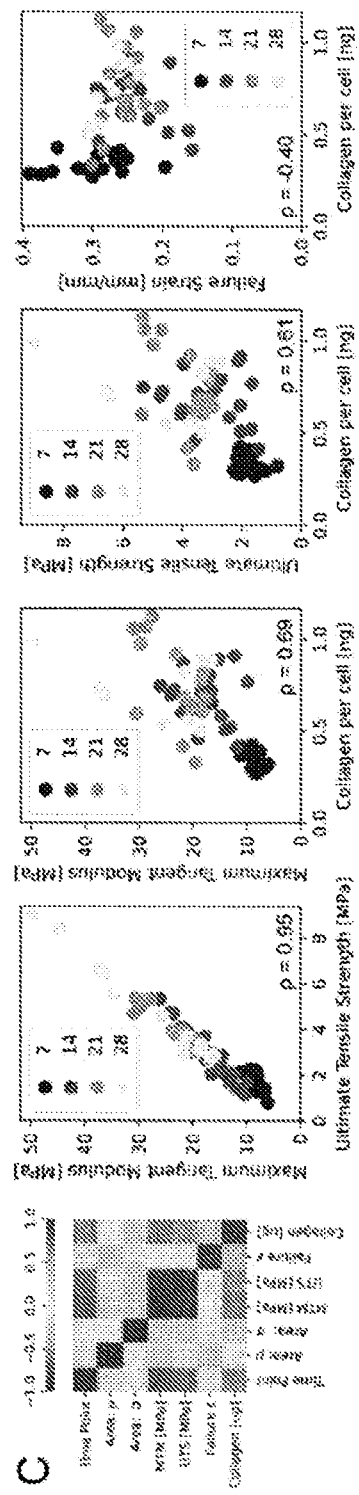

We further investigated the relationship between cell seeding number and maturation time for the 50:50 media group (FIG. 5). As expected, the tissue cross-sectional area increased with cell seeding density from 1.5-6.0×10⁵ cells (Kruskal-Wallis with post-hoc Conover, p<0.05). Stiffness, strength, and collagen synthesis per cell had a significant inverse relationship with cell seeding density (FIG. 5A, Kruskal-Wallis with post-hoc Conover, p<0.05). These findings may be explained by our prior work which showed that the alignment of collagen and cells was inversely related to cell seeding density, with lower seeding density corresponding to higher alignment.[10] While there 50:50 media group seeded at 3×10⁵ cells had no significant changes in cross-sectional area from 7 to 28 days (FIG. 5B, Kruskal-Wallis with post-hoc Conover, p<0.05), there was a significant increase in tissue strength and stiffness over the first 21 days for all time points, but no significant difference between day 21 and 28 (FIG. 5B, Kruskal-Wallis with post-hoc Conover, p<0.05). Interestingly, there was a concomitant increase in collagen content from day 1 to 14, but no significant changes between day 14, 21, or 28 suggesting that the majority of newly synthesized collagen occurs within the first 14 days and corresponds to an increase in tissue mechanics (FIG. 5B, KruskalWallis with post-hoc Conover, p<0.05). We investigated the correlation between time, cross-sectional area, mechanical properties, and collagen content using a Spearman's rank correlation matrix (FIG. 5C). Tissue strength and stiffness were highly correlated ($\rho=0.95$) as were the changes in tissue strength, stiffness, and failure strain as a function of collagen content ($\rho=0.69$, $\rho=0.61$, $\rho=-0.40$, Spearman Correlation with post-hoc Bonferonni, $p=6.79\times 10^{-9}$, $2.49\times 10^{-6}$, and 0.019, respectively). By color coding each time point, it was apparent that the correlation between tissue strength and stiffness versus collagen content was particularly strong for the first 14 to 21 days and began to diverge at later time points which may be a consequence of changes in collagen crosslinking or the collagen quantification method only detecting newly synthesized pepsin-acid soluble collagen and not the transition to mature insoluble collagen that may occur at later time points.

Experiments demonstrated that formation of a successful ring is dependent on the number of cells and the size (diameter) of the cells. The number of cells is also dependent on the diameter of the central peg. Pegs with larger diameter required more cells. It was found that cells per mm of circumference around the peg were a determining factor. In FIGS. 4C-4F, about 100K cells to about 400K cells per 5 mm ring diameter (or central peg diameter) were seeded, which is about 100K cells/15.7 mm circumference to about 400K cells/15.7 mm circumference or 6,300 cells to 25,500 cells per mm of circumference. To account for variations in the size of cells from different tissues, a safe range was calculated to be about 3,000 to 100,000 cells per mm of circumference.

Example 4 Fetal Bovine Serum Negatively Regulates Tissue Mechanics

Figures 6E, 6F:
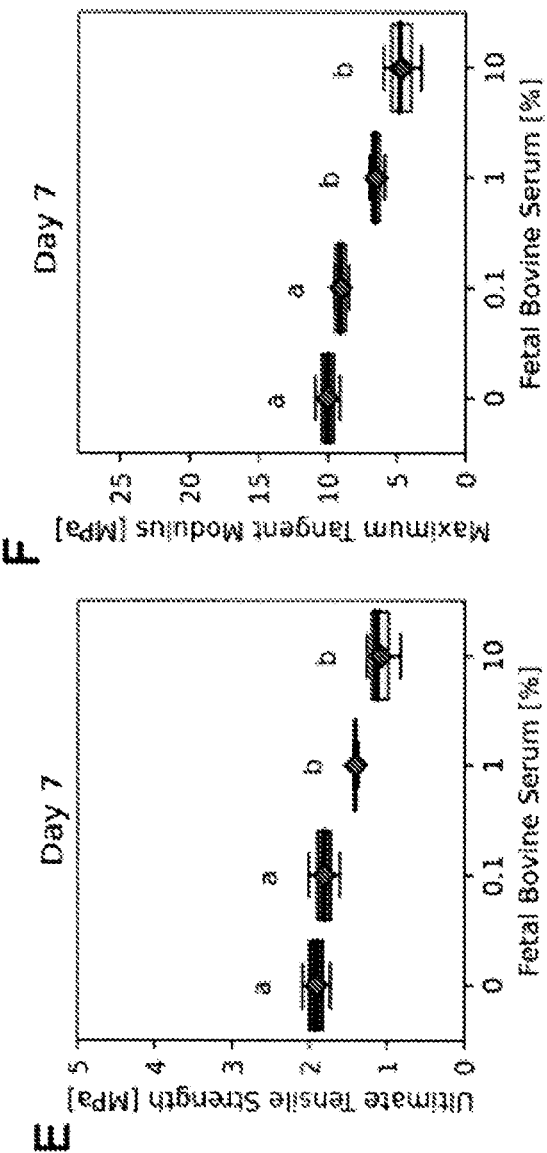
FIG. 6 provides example data to elucidate how the prevalent media supplement impacts the development of tissue mechanics and collagen content; 50:50 media is supplemented with 10%, 1.0%, 0.1%, and 0% [v/v] FBS (FIG. 6A, FIG. 6B, FIG. 6C, FIG. 6D). Interestingly, day 7 and day 14 treated tissues showed a significant dose-dependent negative effect on tissue stiffness and strength compared to untreated control (FIG. 6E, FIG. 6F, FIG. 6G, FIG. 6H, FIG. 6I, FIG. 6J, Kruskal-Wallis with post-hoc Conover, $p<0.05$).
Figures 6G, 6H:
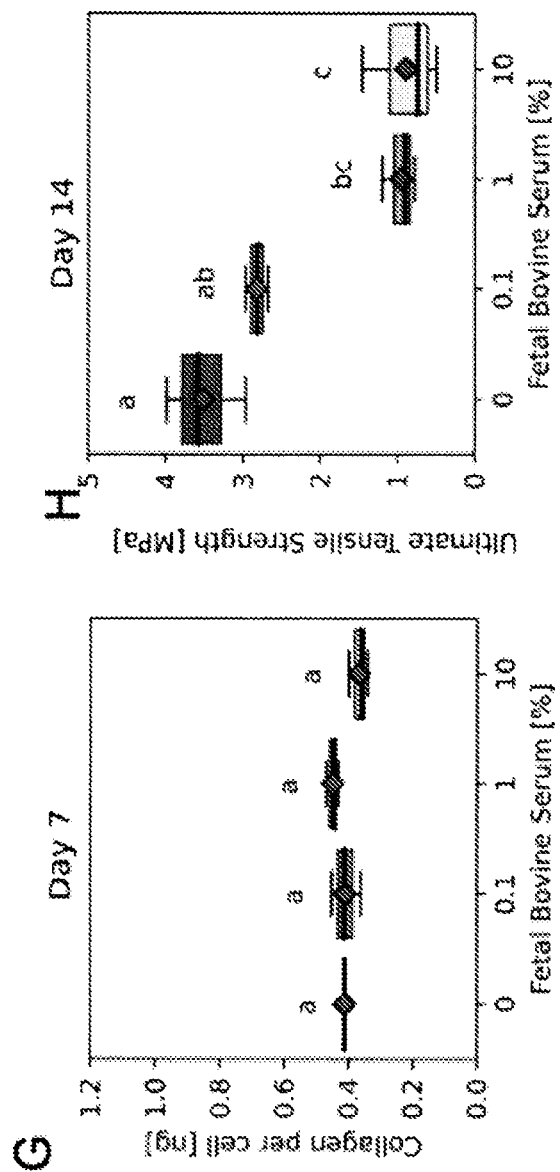

To better understand the response to various biological perturbations, we allowed tissue constructs to self-assemble for 24 h and subsequently replaced media with various doses of relevant biological agents or drug compounds each time tissues were fed. While serum is a common additive in cell culture, in previous studies from our group, tissue constructs cultured with serum displayed unstable morphology characterized by the development of non-uniform thickness, necking, and ultimately breakage of the tissue.[10] To understand how the prevalent media supplement impacted the development of tissue mechanics and collagen content in this study, we supplemented 50:50 media with 10%, 1.0%, 0.1%, and 0% [v/v] FBS (FIG. 6A, FIG. 6B, FIG. 6C, FIG. 6D). Interestingly, day 7 and day 14 treated tissues showed a significant dose-dependent negative effect on tissue stiffness and strength compared to untreated control (FIG. 6E, FIG. 6F, FIG. 6G, FIG. 6H, FIG. 6I, FIG. 6J, Kruskal-Wallis with post-hoc Conover, p<0.05). For example, while day 14 untreated tissues had a stiffness of 19.3±1.99 MPa, tissues cultured with 10% serum only had a stiffness of 4.91±1.37 MPa FIG. 6H, FIG. 6I. However, FBS had no effect on the total collagen synthesis at any dose or time-point (FIG. 6G, FIG. 6J, Kruskal-Wallis with post-hoc Conover, p>0.05). This suggests that components in FBS may be acting on the cells and, or directly on the ECM in ways that reduce the tissue strength and stiffness compared to serum-free controls.

ROCK-Inhibitor Y-27632 Has No Effect on Tissue Mechanics

To investigate the cellular mechanisms responsible for tissue mechanics, we treated tissues with varying doses of Y-27632, a rhokinase inhibitor, and tested their mechanical properties (FIGS. 10A-10D). Interestingly, Y-27632 did not significantly affect tissue stiffness, strength, or collagen content at 7 or 14 days (Kruskal-Wallis with post-hoc Conover, p>0.05). This suggests that the development of tissue stiffness and strength was not mediated by rho-associated protein kinase signaling at the doses tested.

Figure 10A:
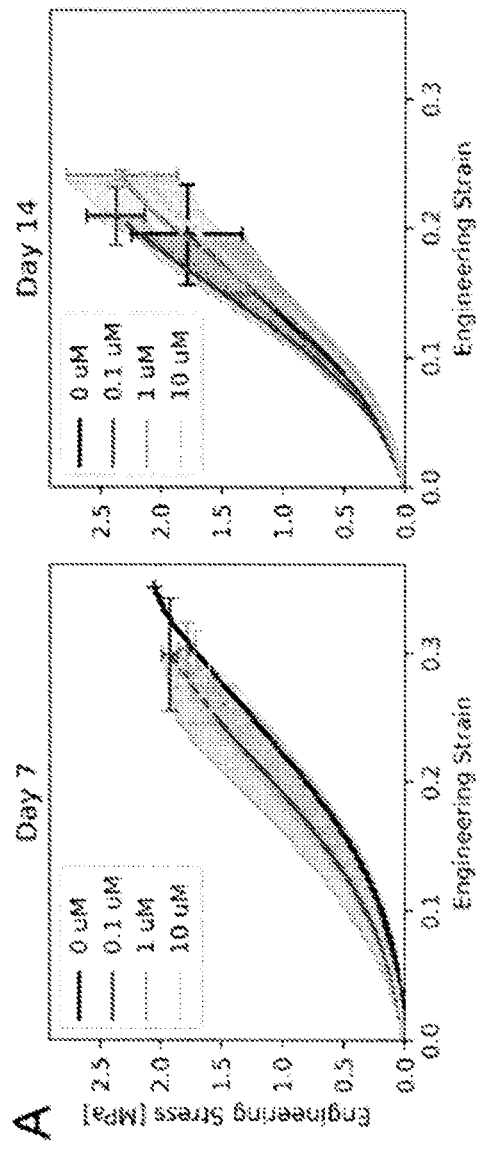
FIG. 10 provides data supporting inhibition of rho kinase had no effect on tissue mechanics of levels of collagen. Tissue rings seeded with $3\times10^5$ cells that were cultured in 50:50 media with varying levels of Y-27632, a rho kinase inhibitor, (0.1, 1.0, 10.0 μM) starting 24 hours after addition of cells were measured at days 7 and 14 for engineering stress (FIG. 10A), ultimate tensile strength (FIG. 10B), maximum tangent modulus (FIG. 10C) and collagen content per ring (FIG. 10D).
Figure 10B:
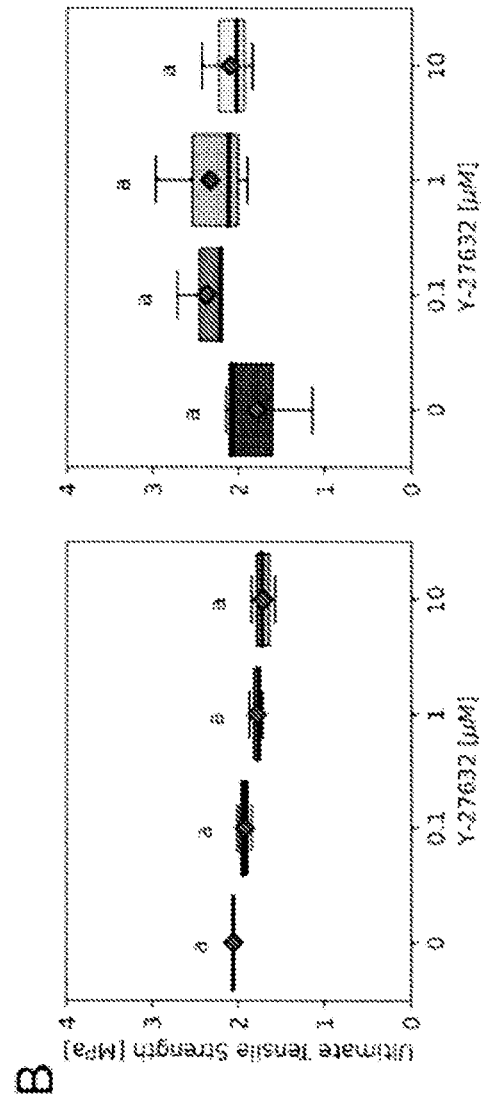

FIGS. 10A-10D show data supporting inhibition of rho kinase had no effect on tissue mechanics or levels of collagen. Tissue rings seeded with $3\times 10^5$ cells that were cultured in 50:50 media with varying levels of Y-27632 (0.1, 1.0, 10.0 M) starting 24 hours after addition of cells were measured at days 7 and 14 for engineering stress (FIG. 10A), ultimate tensile strength (FIG. 10B), maximum tangent modulus (FIG. 10C) and collagen content per ring (FIG. 10D). Y-27632, a rho kinase inhibitor, that inhibits cytoskeletal force generation might be expected to interfere with the development of cell and ECM alignment and maturation. Interestingly, there was no effect on tissue mechanics or levels of collagen at 7 or 14 days. This may be due to most of the cellular reorganization and alignment happening within the first 24 hours of self-assembly prior to the addition of the drug or the doses are not high enough to exert an effect in a 3D tissue model.

TGF-β1 is Critical for Tissue Stiffness and Strength

Figure 7C:
FIG. 7 provides investigative data into the role TGF-β1 played on the development of tissue stiffness, strength, and collagen content. Tissue rings seeded with $3\times10^5$ cells were cultured in 50:50 media with varying levels of SB-431542 (10.0 μM, FIG. 7A), control (FIG. 7B), or TGF-β1, 10 ng mL$^{-1}$ (FIG. 7C). At day 7 and 14, the highest inhibitory concentration of SB-431542 resulted in tissues with the weakest stiffness and strength, whereas the highest TGF-β1 concentration increased tissue mechanics in a significant dose-dependent manner (FIG. 7D, FIG. 7E, FIG. 7G, FIG. 7H, FIG. 7J, FIG. 7K, Kruskal-Wallis with post-hoc Conover, $p<0.05$). Interestingly, there was not a concomitant change in collagen content. SB-431542 had no effect on collagen content at any dose or time point (FIG. 7F, FIG. 7I, FIG. 7L, Kruskal-Wallis with post-hoc Conover, $p>0.05$).
Figure 7E:
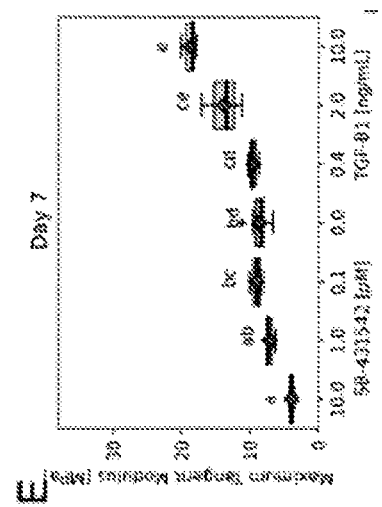
Figure 7D:
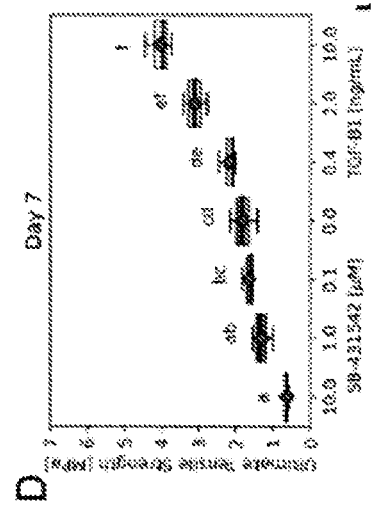
Figure 7F:
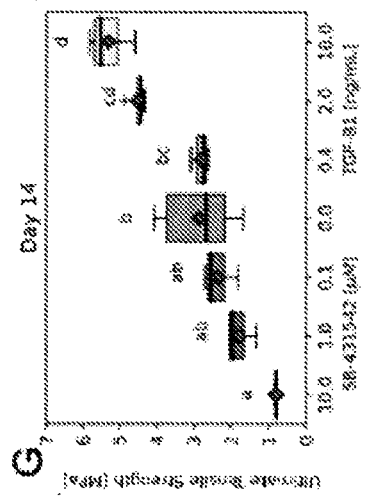
Figure 7G:
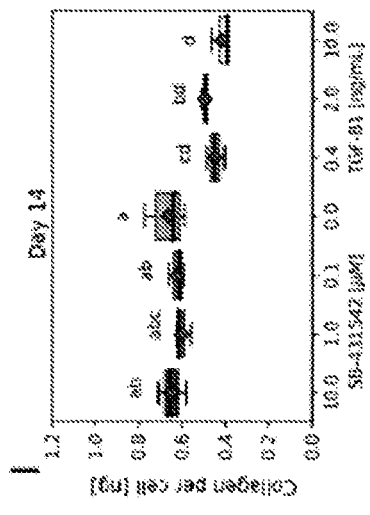
Figure 7H:
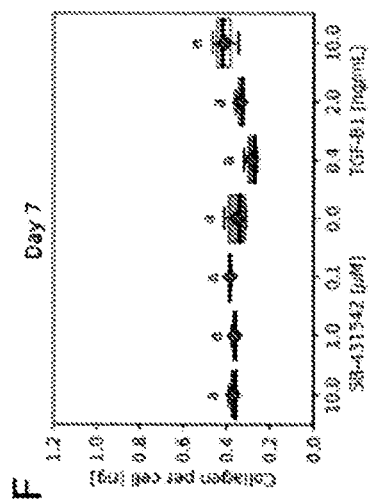
Figure 7I:
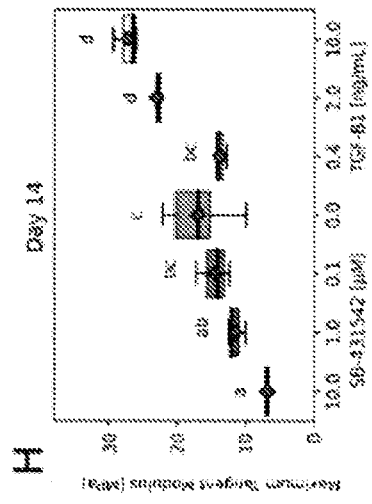
Figure 7K:
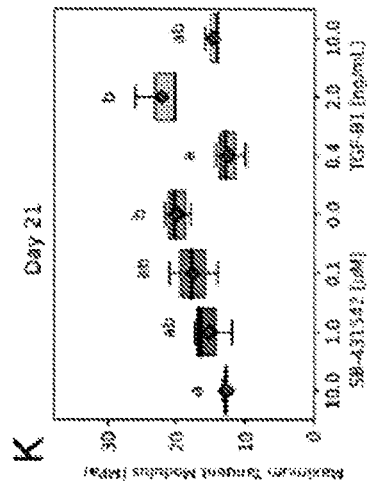
Figure 7J:
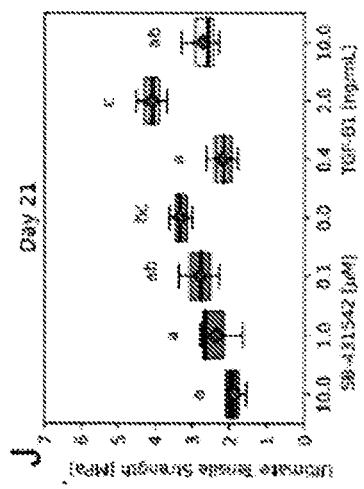
Figure 7L:
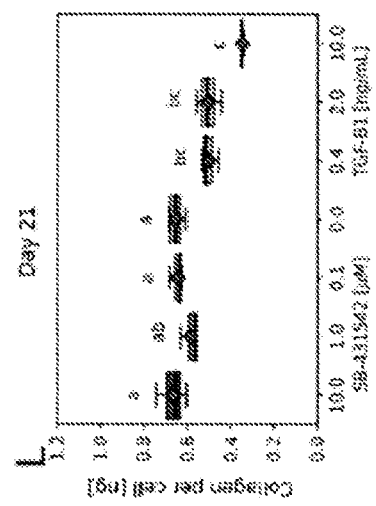
Figures 8D, 8E:
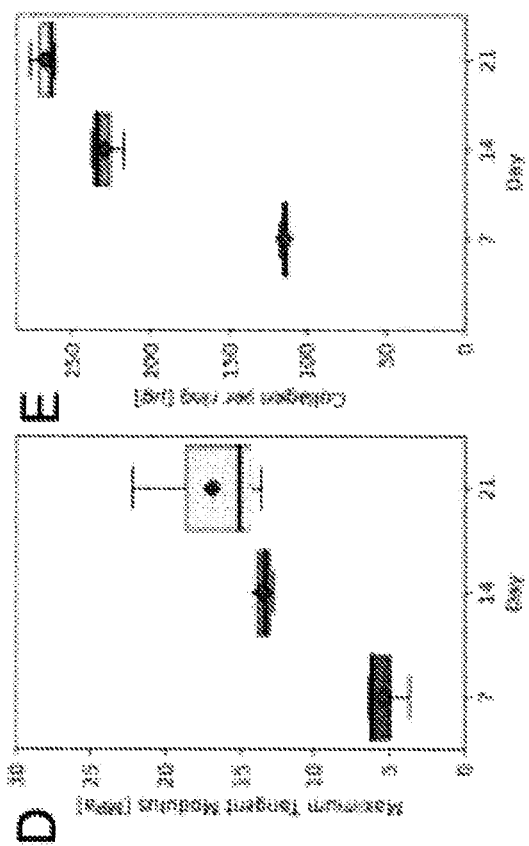
FIG. 8 provides an image of the digestion protocol utilized (FIG. 8A). The engineering strain vs. engineering stress for the TGF-β1 treated tissues is compared in FIG. 8B, and the ultimate tensile strength vs. time (days) in FIG. 8C. The shift in mechanical properties of TGF-β1 treated tissues by data showing maximum tangent modulus vs. time (days) in FIG. 8D total amount of collagen (FIG. 8E).

TGF-β1, a pleiotropic growth factor and proposed master mediator of fibrotic disorders, plays a critical role in ECM synthesis, remodeling, and crosslinking in health and disease. To investigate the role TGF-β1 played on the development of tissue stiffness, strength, and collagen content, we treated tissues grown in 50:50 media with 10, 2, 0.4 ng mL$^{-1}$ and vehicle control as well as 10, 1.0, 0.1 μm, and vehicle control SB-431542, an inhibitor of activin receptor-like kinase receptors (ALK) 4, 5, and 7 that blocks TGF-β type I receptor and subsequent Smad 2/3 activation (FIG. 7). Tissue rings seeded with $3\times 10^5$ cells that were cultured in 50:50 media with varying levels of SB-431542 (0.1, 1.0, 10.0 μm, FIG. 7A), control (FIG. 7B), or TGF-β1, 0.4, 2.0 or 10 ng mL$^{-1}$ (FIG. 7C). At day 7 and 14, the highest inhibitory concentration of SB-431542 resulted in tissues with the weakest stiffness and strength, whereas the highest TGF-β1 concentration increased tissue mechanics in a significant dose-dependent manner (FIG. 7D, FIG. 7E, FIG. 7G, FIG. 7H, FIG. 7J, FIG. 7K) Kruskal-Wallis with post-hoc Conover, p<0.05). Interestingly, there was not a concomitant change in collagen content. SB-431542 had no effect on collagen content at any dose or time point (FIG. 7F, FIG. 7I, FIG. 7L, Kruskal-Wallis with post-hoc Conover, p>0.05). However, this may be due to the collagen assay detecting newly synthesized pepsin-acid soluble collagen fraction, whereas TGF-β1 treatment may have an effect on collagen crosslinking and maturation leading to increased shift from soluble to insoluble collagen that may not be detected. This explanation is supported by the inability for pepsin-acid digest to fully solubilize TGF-β1 treated tissues, whereas control tissues were fully solubilized with the digestion protocol (FIG. 8A). Interestingly, while there were not clearly apparent differences in SHG images for day 21 (FIGS. 8B-8E), the shift in mechanical properties of TGF-β1 treated tissues to highly non-monotonic suggests the need for further characterization of cell and ECM changes for culture conditions longer than 14 days. The engineering strain vs. engineering stress for the TGF-β1 treated tissues is compared in FIG. 8B, and the ultimate tensile strength vs. time (days) in FIG. 8C. The shift in mechanical properties of TGF-β1 treated tissues by data showing maximum tangent modulus vs. time (days) in FIG. 8D total amount of collagen (FIG. 8E).

Figure 9:
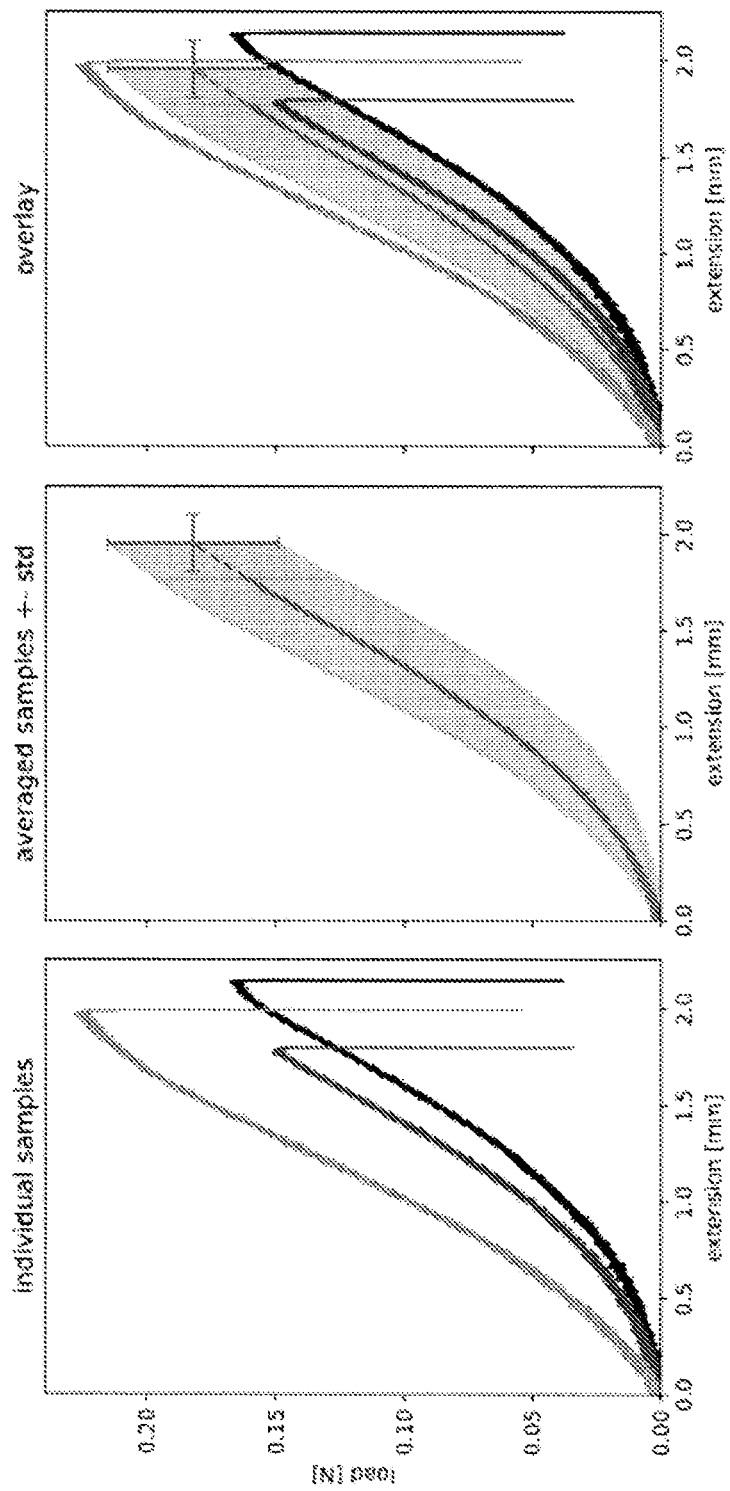
FIG. 9 provides an example of averaging of mechanical stress-strain data with individual samples' data at left, averaged samples with shaded regions and error bars representing standard deviation to show the variability in data including failure stress and strain (middle), and an overlay at right.

FIG. 9 provides an example of averaging of mechanical stress-strain data with individual samples' data at left, averaged samples with shaded regions and error bars representing standard deviation to show the variability in data including failure stress and strain (middle), and an overlay at right.

Experimental Information

Cell Source and Culture Conditions: Juvenile normal human dermal fibroblasts (jNHDF) were purchased from PromoCell (Heidelberg, Germany). Cells were expanded in Dulbecco's Modified Eagle's medium (DMEM) with high glucose, l-glutamine, phenol red, and sodium pyruvate (11995065, Thermo Fisher Scientific, Waltham, MA) supplemented with 10% FBS and 1% penicillin/streptomycin at 10% $CO_2$ and 37° C. Cells were passaged (P3-8) and expanded using a standard trypsin protocol. Cells were rinsed with 1× PBS (SH30256.FS, Thomas Scientific, Swedesboro, NJ), exposed to 0.05% trypsin in PBS for 4 min, quenched with serum containing media, centrifuged at 220g for 3 min, resuspended, counted, and plated at a density of $3.5-7.0\times10^3$ cells per $cm^2$. Ring-shaped tissue constructs (5 mm) were seeded at $3\times10^5$ cells per well in 1 mL of media exchanged every 2/3 days unless otherwise noted. For media composition experiments, tissues were cultured in serum-free DMEM supplemented with 0.1 mm 2-phospho-l-ascorbic acid trisodium salt (SigmaAldrich, St. Louis, MO), 50.0 μg $mL^{-1}$ l-proline (Thermo Fisher), 1% penicillin/streptomycin (SFM+), advanced DMEM (12491015) supplemented with 4 mm GlutaMax and 1% penicillin/streptomycin (SFMA), or a 50:50 mixture of the two (50:50 SFM+/SFMA).

Fabrication of Ring-Shaped Tissue Constructs: Ring-shaped molds were designed usingCADsoftware (SolidWorks Corporation, Concord, MA) and fabricated from stainless steel 316 L on a CNC lathe (Protolabs, Maple Plain, MN). The stainless steel parts were designed to fit into a single well of a standard 24 well plate. Ring-shaped agarose gels were cast by placing the stainless steel part into a well filled with 1.5 mL of molten, sterile 2% (w/v) agarose (BP160-500, Fisher Scientific, Hampton, NH) in 1× PBS, allowed to harden for 15 min, and removed. This resulted in an agarose gel with an inner peg diameter of 5 mm surrounded by a 0.75 mm cylindrical trough. A lid mirroring a standard 24 well plate lid was fabricated out of aluminum with through holes above each well to permit the placement of all 24 stainless steel parts simultaneously. Gels were equilibrated in serum-free DMEM with 1% penicillin/streptomycin at 37° C., 10% $CO_2$ for at least 24 h before use.

Drug Treatment: For all dose-response experiments, ring constructs were allowed to form for 24 h prior to treatment. FBS (12483020, Life Technologies, Carlsbad, CA), Y-27632 (S1049, Selleck Chemicals, Houston, TX), TGF-β1 (7754-BH-25, Selleck Chemicals), and SB-431542 (S1067, Selleck Chemicals) doses were freshly prepared from frozen aliquots and resuspended in 50:50 SFM+/SFMA medium prior to feeding 3× per week. Doses of FBS were prepared at 10%, 1.0%, and 0.1% [v/v] concentrations with a 0% control. Y-27632 and SB-431542 were reconstituted in dimethyl sulfoxide (DMSO) and resuspended at a final concentration of 10, 1.0, 0.1, and a 0 μm vehicle control with a DMSO final volume always less than 0.1%. TGF-β1 was reconstituted in 0.1% bovine serum albumin (BSA) in 4 mm HCl (RB04, Selleck Chemicals) and prepared at a final concentration of 10, 2, 0.4, and 0 ng $mL^{-1}$ vehicle control.

Histology: Agarose gels containing fibroblast rings were transferred to a new 24 well plate, washed with PBS, fixed with 10% buffered formalin, and kept at 4° C. until ready to process. Prior to embedding, formalin was removed and fresh 2% [w/v] agarose solution was added to the top of the gels to encapsulate the tissue. After cooling, the gels containing the fixed tissues were carefully removed from their 24 well plates using a spatula and moved to cassettes that were embedded in paraffin. After processing, samples were cut into sections 5-8 μm thick using a Leica RM2265 microtome (Leica Microsystems, Wetzlar, Germany). Sections were stained for either hematoxylin and eosin (Richard-Allan Scientific; Thermo Scientific), or Masson's trichrome (Electron Microscopy Sciences, Hatfield, PA, USA) according to manufacturer protocols. Stained slides were digitized using an Aperio ScanScope CS (Leica Microsystems, Wetzlar, Germany).

Collagen Quantification: Tissues were homogenized with 2 mm glass beads for 2/3 min and solubilized in 0.1 mg $mL^{-1}$ pepsin in 0.5 m acetic acid at 4° C. for 48 h. Total pepsin-acid soluble collagen was quantified via sircol dye binding assay per kit instructions (S5000, Biocolor, United Kingdom). Absorbance was measured at 525 nm and collagen content was determined from a standard curve and adjusted to microgram equivalent of native pepsin-acid soluble collagen.

Mechanical Testing: Ring-shaped microtissues were mechanically tested using custom designed grippers on a uniaxial tensile testing setup (Instron 5943, Norwood, MA) equipped with a 5N (5 mn resolution) load cell. Agarose molds were trimmed with a razor blade and top and sideview brightfield images were obtained on a Nikon Eclipse Ts2 microscope (Nikon, Tokyo, Japan) to determine the initial elliptical cross-sectional area ($A_0$). Just prior to testing, tissue constructs were gently removed from the agarose mold using forceps and mounted between grippers which consisted of two horizontal cylindrical segments with a circular diameter of 3 mm fabricated from glass filled nylon (PA614-GS, ProtoLabs). Tissues were brought to a 5 mm initial grip-to-grip distance and tests were performed in PBS at 37° C. Unless otherwise noted, tests were performed at a strain rate of 0.1% initial length per second, corresponding to 5 μm per second for 5 mm diameter rings to approach quasi-static loading. Load (N) and extension (mm) were sampled at 20 Hz and tests automatically terminated when a drop in load greater than 40% was detected which corresponded to tissue failure. Tests were optically recorded using a custom imaging setup equipped with a BlackflyS, Color Camera (BFS-U3-200S6CC USB3, Edmund Optics, Barrington, NJ) sampled at 2 Hz.

Mechanical Data Analysis and Visualization: Mechanical parameters were quantified with Python 3.6 (Python Software Foundation) using SciPy, NumPy, Pandas, Matplotlib, scikit-image, scikit-posthocs, and statsmodels modules.[51, 52, 53, 54, 55, 56, 57] Raw load data were normalized to remove the drag force measured by running the test protocol in PBS at 37° C. without a sample loaded on the grippers. Mechanical testing protocol was adapted from Adebayo et al. and Gwyther et al.[58, 59] The tissue was considered in tension and the gauge length was recorded when the raw load was greater than 5 mn. Engineering stress ($N/2A_0$) and engineering strain ($\Delta L/L_{gauge}$) were analyzed to determine the maximum tangent modulus (MTM), ultimate tensile strength (UTS), and failure strain, where $A_0$ was the elliptical cross-sectional area (e.g., Equations 1-4 below). The tangent modulus or slope of the stress-strain curve was obtained by acquiring linear fits over a region of 8% strain for all points on the curve as described in Ristaniemi et al.[60] In all tests, the maximum tangent modulus (MTM) fell within the "linear region" of the stress-strain curve. This was calculated to compare to existing biomechanical literature which often uses maximum tangent modulus, Young's Modulus, and stiffness terminology interchangeably. Engineering stress and strain are only valid for small deformations, which is not the case for many biological specimens. True stress and strain were also quantified assuming tissue volume conservation and uniform deformation. For all mechanical analyses, along with engineering stress-strain, the true stress strain and analyses using minimum and mean cross-sectional area were analyzed.

$$\text{EngineeringStrain} = \Delta L/L_{gauge} \quad \text{(Equation 1)}$$

$$\text{EngineeringStress} = N/(2A_0) \quad \text{(Equation 2)}$$

$$\text{TrueStrain} = ln(1 + \text{EngineeringStrain}) \quad \text{(Equation 3)}$$

$$\text{TrueStress} = \text{EngineeringStress}(1 + \text{EngineeringStrain}) \quad \text{(Equation 4)}$$

Multiphoton Second-Harmonic Generation (SHG) Microscopy: Fibrillar collagen was visualized using an Olympus FV-1000-MPE multiphoton microscope (Olympus, Tokyo, Japan) equipped with a Mai Tai HP tunable laser with the excitation wavelength set to 790 nm and a 405/40 filter cube to select for fibrillar collagen second-harmonic signal. Similar to histology processing, agarose gels containing fibroblast rings were transferred to a new 24 well plate, washed with PBS, fixed with 10% buffered formalin, and kept at 4° C. until imaging. Tissue constructs were imaged in situ without removing them from the agarose mold using a 25× (Numerical Aperture 1.05, Working Distance 2 mm) dipping objective in PBS. Collagen crimp images were obtained by gently removing tissue rings from the agarose mold using forceps and immediately placing the rings into fixative to capture the instantaneous relaxation.

Electron Microscopy Sample Preparation: Specimens were prepared by adapting an enhanced contrast protocol.[61] Specimens were fixed in 2.5% glutaraldehyde in 0.15 m sodium cacodylate, 2% paraformaldehyde, and 2 mm calcium chloride overnight or longer at 4° C. then washed 5× for 3 min each in cold 0.15 m sodium cacodylate buffer with 2 mm calcium chloride. Specimens were then incubated for 1 h on ice in a solution comprised of equal volumes of 4% osmium tetroxide and 3% potassium ferrocyanide in a 0.3 m cacodylate buffer with 4 mm calcium chloride prepared immediately prior to use. Specimens were then washed 5× for 3 min each in filtered milliQ $H_2O$ and then incubated at room temperature for 20 min in a fresh solution of filtered 94.2 mm thiocarbohydrazide (TCH) in milliQ $H_2O$. Specimens were then washed 5× for 3 min each in filtered dd$H_2O$, incubated in 2% osmium tetroxide in milliQ $H_2O$ for 30 min and then washed 5× for 3 min each in filtered milliQ $H_2O$. Specimens were placed in 1% uranyl acetate in dd$H_2O$ overnight at 4° C. and then washed 5× for 3 min each in filtered milliQ $H_2O$. Specimens were then incubated in Walton's lead aspartate solution (20 mm lead nitrate, 30 mm aspartic acid solution, pH 5.5) at 60° C. for 30 min and then washed 5× for 3 min in filtered milliQ $H_2O$. Specimens were dehydrated in graded ethanol solutions of 20%, 50%, 70%, 95% for 20 min each followed by dehydration in 100% ethanol 3×20 min followed by 24 h in 100% ethanol.

For scanning electron microscopy (SEM), dehydrated samples were critical point dried with liquid $CO_2$, and sputter coated with 100 Å gold-palladium and visualized with a Thermo Fischer Scientific Apreo VS scanning electron microscope. For transmission electron microscopy (TEM) and serial block-face (SBF) scanning electron microscopy, dehydrated samples were rinsed with propylene oxide 1× for 20 min and then infiltrated with fresh propylene oxide for up to 24 h.[61] Samples were embedded in Epon resin at 1:3, 1:1, 3:1, 1:0 Epon:propylene oxide on a rotator for 12 h each. Samples were then transferred to fresh 100% Epon for 6 h and cured. 80 nm sections were visualized on a Phillips EM 410 transmission electron microscope.

Statistical Analysis: All data including error bars in bar and box plots and shaded regions in line plots are represented as the mean±standard deviation. For box plots, the horizontal black line represents the median and the red diamond represents the mean. Homoscedasticity and normality were tested with Levene's test and Shapiro-Wilk test, respectively. To determine statistical significance between multiple groups, for parametric One-way ANOVA with post-hoc Tukey HSD was used or nonparametric Kruskal-Wallis test with post-hoc Conover was used. Experimental groups labeled with unique letters denote statistical significance of $p<0.05$ whereas experimental groups labeled with shared letters denote not statistically significant within a subplot. All statistics were performed using Python.

REFERENCES

[1] B. K. Connizzo, S. M. Yannascoli, L. J. Soslowsky, Matrix Biol. 2013, 32, 106.

[2] K. L. Goh, D. F. Holmes, H.-Y. Lu, S. Richardson, K. E. Kadler, P. P. Purslow, T. J. Wess, J. Biomech. Eng. 2008, 130, 2.

[3] O. Vanakker, B. Callewaert, F. Malfait, P. Coucke, Annual Review of Genomics and Human Genetics 2015, 16, 229.

[4] D. J. Tilstra, P. H. Byers, Annu. Rev. Med. 1994, 45, 149.

[5] P. Roca-Cusachs, V. Conte, X. Trepat, Nat. Cell Biol. 2017, 19, 742.

[6] M. Gomez-Gonzalez, E. Latorre, M. Arroyo, X. Trepat, Nat. Rev. Phys. 2020, 2, 300.

[7] J. Zhang, N. C. Chada, C. A. Reinhart-King, Front. Bioeng. Biotechnol. 2019, 7, 412.

[8] T. Wang, P. Chen, M. Zheng, A. Wang, D. Lloyd, T. Leys, Q. Zheng, M. H. Zheng, J. Orthop. Res. 2018, 36, 566.

[9] U. G. Longo, A. Lamberti, S. Petrillo, N. Maffulli, V. Denaro, Scaffolds in Tendon Tissue Engineering 2012, 2012, 517165.

[10] B. T. Wilks, E. B. Evans, M. N. Nakhla, J. R. Morgan, Acta Biomater. 2018, 81, 70.

[11] A. P. Napolitano, P. Chai, D. M. Dean, J. R. Morgan, Tissue Eng. 2007, 13, 2087.

[12] A. P. Napolitano, D. M. Dean, A. J. Man, J. Youssef, D. N. Ho, A. P. Rago, M. P. Lech, J. R. Morgan, BioTechniques 2007, 43, 494.

[13] D. M. Dean, A. P. Napolitano, J. Youssef, J. R. Morgan, FASEB J. 2007, 21, 4005.

[14] J. Y. Schell, B. T. Wilks, M. Patel, C. Franck, V. Chalivendra, X. Cao, V. B. Shenoy, J. R. Morgan, Biomaterials 2016, 77, 120.

[15] J. Youssef, A. K. Nurse, L. B. Freund, J. R. Morgan, Proc. Natl. Acad. Sci. USA 2011, 108, 6993.

[16] C. M. Livoti, J. R. Morgan, Tissue Eng., Part A 2010, 16, 2051.

[17] D. M. Dean, J. R. Morgan, Tissue Eng., Part A 2008, 14, 1989.

[18] M. L. Manning, R. A. Foty, M. S. Steinberg, E.-M. Schoetz, Proc. Natl. Acad. Sci. USA 2010, 107, 12517.

[19] N. S. Kalson, D. F. Holmes, Z. Kapacee, I. Otermin, Y. Lu, R. A. Ennos, E. G. Canty-Laird, K. E. Kadler, Matrix Biol. 2010, 29, 678.

[20] E. G. Canty, T. Starborg, Y. Lu, S. M. Humphries, D. F. Holmes, R. S. Meadows, A. Huffman, E. T. O'Toole, K. E. Kadler, J. Biol. Chem. 2006, 281, 38592.

[21] J. R. Cantor, Trends Cell Biol. 2019, 29, 854.

[22] F. Grinnell, H. Fukamizu, P. Pawelek, S. Nakagawa, Exp. Cell Res. 1989, 181, 483.

[23] J. M. S. Lemons, X.-J. Feng, B. D. Bennett, A. Legesse-Miller, E. L. Johnson, I. Raitman, E. A. Pollina, H. A. Rabitz, J. D. Rabinowitz, H. A. Coller, PLoS Biol. 2010, 8, 10.

[24] E. A. Pollina, A. Legesse-Miller, E. Haley, T. Goodpaster, J. RandolphHabecker, H. A. Coller, Cell Cycle 2008, 7, 2056.

[25] H. A. Coller, L. Sang, J. M. Roberts, PLoS Biol. 2006, 4, e83.

[26] M. Mitra, L. D. Ho, H. A. Coller, Methods in Mol. Biol. 2018, 1686, 27.

[27] W. Liu, B. Chen, D. Deng, F. Xu, L. Cui, Y. Cao, Tissue Eng. 2006, 12, 775.

[28] D. Deng, W. Liu, F. Xu, Y. Yang, G. Zhou, W. J. Zhang, L. Cui, Y. Cao, Biomaterials 2009, 30, 6724.

[29] S. N. Gacheru, K. M. Thomas, S. A. Murray, K. Csiszar, L. I. SmithMungo, H. M. Kagan, J. Cell. Biochem. 1997, 65, 395.

[30] P. Atsawasuwan, Y. Mochida, M. Katafuchi, M. Kaku, K. S. K. Fong, K. Csiszar, M. Yamauchi, J. Biol. Chem. 2008, 283, 34229.

[31] T. G. Voloshenyuk, E. S. Landesman, E. Khoutorova, A. D. Hart, J. D. Gardner, Cytokine 2011, 55, 90

[32] M. G. Jones, O. G. Andriotis, J. J. Roberts, K. Lunn, V. J. Tear, L. Cao, K. Ask, D. E. Smart, A. Bonfanti, P. Johnson, A. Alzetani, F. Conforti, R. Doherty, C. Y. Lai, B. Johnson, K. N. Bourdakos, S. V. Fletcher, B. G. Marshall, S. Jogai, C. J. Brereton, S. J. Chee, C. H. Ottensmeier, P. Sime, J. Gauldie, M. Kolb, S. Mahajan, A. Fabre, A. Bhaskar, W. Jarolimek, L. Richeldi, et al., eLife 2018, 7, e36354.

[33] J. Merl-Pham, T. Basak, L. Knuppel, D. Ramanujam, M. Athanason, J. Behr, S. Engelhardt, O. Eickelberg, S. M. Hauck, R. Vanacore, C. A. Staab-Weijnitz, Matrix Biol. Plus 2019, 1, 100005.

[34] M. Jeanne, D. B. Gould, Matrix Biol. 2017, 57-58, 29.

[35] A. Granata, F. Serrano, W. G. Bernard, M. McNamara, L. Low, P. Sastry, S. Sinha, Nat. Genet. 2017, 49, 97.

[36] P. Martins, A. L. Silva-Filho, A. M. R. M. Fonseca, A. Santos, L. Santos, T. Mascarenhas, R. M. N. Jorge, A. M. Ferreira, Arch. Gynecol. Obstet. 2013, 287, 313

[37] S. F. Viegas, S. Yamaguchi, N. L. Boyd, R. M. Patterson, J. Hand Surg. 1999, 24, 456.

[38] N. Chandrashekar, H. Mansouri, J. Slauterbeck, J. Hashemi, J. Biomech. 2006, 39, 2943.

[39] The Merck Manual of Diagnosis and Therapy, (2011). 19th Edition, published by Merck Sharp & Dohme Corp., (ISBN 978-0-911910-19-3).

[40] The Encyclopedia of Molecular Cell Biology and Molecular Medicine, Robert S. Porter et aL. (eds.), published by Blackwell Science Ltd., 1999-2012 (ISBN 9783527600908).

[41] Molecular Biology and Biotechnology: a Comprehensive Desk Reference, (1995). Robert A. Meyers (ed.), published by VCH Publishers, Inc. (ISBN 1-56081-569-8).

[42] Immunology, (2006). Werner Luttmann, published by Elsevier.

[43] Janeway's Immunobiology, (2014). Kenneth Murphy, Allan Mowat, Casey Weaver (eds.), Taylor & Francis Limited, (ISBN 0815345305, 9780815345305).

[44] Lewin's Genes XI, (2014). published by Jones & Bartlett Publishers (ISBN-1449659055).

[45] Michael Richard Green and Joseph Sambrook, (2012). Molecular Cloning: A Laboratory Manual, 4th ed., Cold Spring Harbor Laboratory Press, Cold Spring Harbor, N.Y., USA (ISBN 1936113414).

[46] Davis et al., (2012). Basic Methods in Molecular Biology, Elsevier Science Publishing, Inc., New York, USA (ISBN 044460149X).

[47] Laboratory Methods in Enzymology: DNA, (2013). Jon Lorsch (ed.) Elsevier (ISBN 0124199542).

[48] Current Protocols in Molecular Biology (CPMB), (2014). Frederick M. Ausubel (ed.), John Wiley and Sons (ISBN 047150338X, 9780471503385).

[49] Current Protocols in Protein Science (CPPS), (2005). John E. Coligan (ed.), John Wiley and Sons, Inc.

[50] current Protocols in Immunology (CPI) (2003). John E. Coligan, ADAM Kruisbeek, David H Margulies, Ethan M Shevach, Warren Strobe, (eds.) John Wiley and Sons, Inc. (ISBN 0471142735, 9780471142737).

[51] P. Virtanen, R. Gommers, T. E. Oliphant, M. Haberland, T. Reddy, D. Cournapeau, E. Burovski, P. Peterson, W. Weckesser, J. Bright, S. J. van der Walt, M. Brett, J. Wilson, K. J. Millman, N. Mayorov, A. R. J. Nelson, E. Jones, R. Kern, E. Larson, C. J. Carey, I. Polat, Y. Feng, E. W. Moore, J. VanderPlas, D. Laxalde, J. Perktold, R. Cimrman, I. Henriksen, E. A. Quintero, C. R. Harris, et al., Nat. Methods 2020, 17, 261.

[52] C. R. Harris, K. J. Millman, S. J. van der Walt, R. Gommers, P. Virtanen, D. Cournapeau, E. Wieser, J. Taylor, S. Berg, N. J. Smith, R. Kern, M. Picus, S. Hoyer, M. H. van Kerkwijk, M. Brett, A. Haldane, J. F. del Rio, M. Wiebe, P. Peterson, P. Gerard-Marchant, K. Sheppard, T. Reddy, W. Weckesser, H. Abbasi, C. Gohlke, T. E. Oliphant, Nature 2020, 585, 357.

[53] W. McKinney, in Proceedings of the 9th Python in Science Conference, Austin, Texas 2010, pp. 56-61.

[54] J. D. Hunter, Comput. Sci. Eng. 2007, 9, 90.

[55] S. v. d. Walt, J. L. Schönberger, J. Nunez-Iglesias, F. Boulogne, J. D. Warner, N. Yager, E. Gouillart, T. Yu, PeerJ 2014, 2, e453.

[56] M. A. Terpilowski, J. Open Source Software 2019, 4, 1169.

[57] S. Seabold, J. Perktold, in Proceedings of the 9th Python in Science Conference (Eds: S. van der Walt, J. Millman), Austin, Texas 2010, pp. 92-96.

[58] O. Adebayo, T. A. Hookway, J. Z. Hu, K. L. Billiar, M. W. Rolle, J. Biomed. Mater. Res., Part A 2013, 101A, 428.

[59] T. A. Gwyther, J. Z. Hu, A. G. Christakis, J. K. Skorinko, S. M. Shaw, K. L. Billiar, M. W. Rolle, Cells Tissues Organs 2011, 194, 13.

[60] A. Ristaniemi, L. Stenroth, S. Mikkonen, R. K. Korhonen, J. Biomech. 2018, 79, 31.

[61] T. J. Deerinck, E. A. Bushong, A. Thor, M. H. Ellisman, Technical report, National Center for Microscopy and Imaging Research UCS, 2010.

All patents and other publications; including literature references, issued patents, published patent applications, and co-pending patent applications; cited throughout this application are expressly incorporated herein by reference for the purpose of describing and disclosing, for example, the methodologies described in such publications that might be used in connection with the technology described herein. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

The foregoing written specification is considered to be sufficient to enable one skilled in the art to practice the present aspects and embodiments. The present aspects and embodiments are not to be limited in scope by examples provided, since the examples are intended as a single illustration of one aspect and other functionally equivalent embodiments are within the scope of the disclosure. Various modifications in addition to those shown and described herein will become apparent to those skilled in the art from the foregoing description and fall within the scope of the appended claims. The advantages and objects described herein are not necessarily encompassed by each embodiment. Those skilled in the art will recognize, or be able to ascertain using no more than routine experimentation, many equivalents to the specific embodiments described herein. Such equivalents are intended to be encompassed by the following claims.

What is claimed is:

1. An in vitro quantitative method for proportionally quantifying changes in a 3D extracellular matrix (ECM) mechanics, alignment and organization due to a presence, an amount, a time of contact, a concentration or an absence of a test condition during a synthesis of the ECM, the method comprising the steps of:
   (1) obtaining a non-adhesive cell culture well including a non-adhesive peg disposed in the center of the well configured to develop a cellular alignment around the peg during a culture of anchorage-dependent cells and self-assembling cells, whereby the anchorage-dependent and self-assembling cells are operative to grow around the peg and self-aggregate and self-assemble using only one or more cell-derived forces;
   (2) seeding the culture well with a culture medium and the anchorage-dependent cells and the self-assembling cells, wherein the cells are configured to synthesize ECM components and the ECM during a cultivation;
   (3) cultivating the cells, whereby the cells grow and adhere to one another without an application of an external force, an anchorage force/material and a scaffolding material, but the cells do not adhere to the well and do not adhere to the peg; whereby the cells exert cytoskeleton-mediated tension and cell-driven self-assembly to form a 3D ring-shaped geometry of tissue ECM around the peg; wherein the ring-shaped geometry of ECM includes the tension, the cell-driven self-assembly, the cellular alignment around the peg from steps (1)-(3), and mechanics and organization that are all free of an effect from an external force, anchorage force/material and a scaffolding material thereby providing the ECM with a no cell-to-scaffold biophysical crosstalk and a no cell-to-external force biophysical crosstalk;
   (4) measuring one or more properties of the tissue ECM to obtain a proportional signal for each of the one or more properties;
   (5) providing a test condition and repeating steps (1)-(4) with a contacting of the cells with the test condition by contacting the tissue ECM and/or cells with an agent, a force, or a factor; whereby the presence, amount, time of contact, concentration or absence of the test condition either does or does not cause a proportional and quantitative, un-predicted, observable and measurable change in the one or more properties of the ECM and whereby the measuring in step (4) measures the proportional signal that is a quantitative response to the presence, amount, time of contact, concentration or absence that causes a proportional change in the one or more properties, then comparing the proportional signal before the contacting and the proportional signal after the contacting;
   wherein the method is configured to provide tissue ECM that does not cause a noise value and/or a crosstalk value in the signal of the measuring of the change from the test condition because of an absence of a scaffolding material, and anchorage force/material and an externally applied force during the execution of steps (1), (2), (3), (4) and the method is configured to provide an absence of a noise value including a no cell-to-scaffold biophysical crosstalk signal and a no cell-to-external force biophysical crosstalk signal; and wherein the absence of the noise value and/or the crosstalk values provides and enables a quantitative method that is proportionally responsive to a presence of test condition, an absence of test condition, a time of contact of test condition applied and/or a difference in amount/magnitude of the test condition.

2. The method of claim 1, wherein the cultivating is performed in an absence of an exogenously added scaffolding material and in absence of a material that is adhesive for cells or operative as an anchoring material.

3. The method of claim 1, wherein the cultivating is performed without an application of an externally applied force, and wherein the anchorage-dependent and self-assembling cells provide a self-force by self-assembling around the peg.

4. The method of claim 1, further comprising wherein the method is operative to effect a quantitative change in one or more properties of the tissue ECM and/or the cells due to a presence, absence, time of contact, and/or a difference in amount/magnitude of one or more test compounds and/or biological agents; wherein the quantitative change is proportional to the one or more test compounds and/or biological agents; and wherein the quantitative change is further effected by an additional execution of steps (6) and (7) below:
   (6) recording the one or more properties of the tissue ECM and/or the cells without contacting with one or more test compounds and/or biological agents and then contacting the tissue ECM and/or the cells with the one or more test compounds and/or biological agents; and
   (7) waiting for a period of time then repeating the recording in step (6) and comparing the one or more properties of the tissue ECM and/or the cells before the contacting in step (6) to the one or more properties of the tissue ECM and/or the cells after the waiting for the period of time;
   whereby the waiting for the period of time and comparing and/or comparison in step (7) is configured to/operative to effect a quantitative change in one or more properties of the tissue ECM and/or the cells and to provide a quantitative measurement by the comparing and/or comparison.

5. The method of claim 1, wherein the cellular alignment is only and solely directed by one or more cell-derived forces, a cell-mediated tension, and a circumferential cellular alignment around the peg.

6. The method of claim 1, further comprising the step of:
   (a) removing the tissue ECM and/or the cells from the culture well.

7. The method of claim 1, wherein the measuring comprises an aid of an instrumentation; a measurement of structure-function relationships; a measurement of geometry of ECM, a measurement of a size of ECM, an alignment of ECM, a spatial distribution of cells and/or of ECM; a measurement of an instantaneous relaxation of ECM after removal from the culture well; an ECM or collagen crimping behavior; a quantification using a minimum cross-sectional area or a mean cross-sectional area; a measurement of ECM or collagen content per cell; a measurement of histology, a multiphoton second-harmonic generation measurement, an electron microscopy, and/or serial block-face scanning electron microscopy; a measurement of mechanical testing, tensile strength, maximum tangent modulus, stiffness, failure strain, thickness measurement (x-y), and/or length measurement (z); a measurement of circumferentially-aligned fibrillar ECM or collagen; video, imaging, and/or microscopy; pepsin-acid soluble collagen fraction; a measurement of tissue homeostasis and/or dysregulation; hematoxylin and eosin staining, or Masson's trichrome staining; measurement of a degree of crosslinking; measurement including a simulation of motion; measurement of cell-derived changes, changes in synthesis, organization, alignment, and/or mechanics of the ECM; fatigue testing; measurement of one or more secreted soluble factors in the culture medium; measurement of proteomics; or a measurement of genomics.

8. The method of claim 1, wherein the test condition comprises; an aging condition, a test of a mechano-transduction pathway, a genotype and/or phenotype difference, an addition of nucleic acids or amino acids, a presence of an additional cell type, a presence of a virus and/or prion, a difference in medium composition, a difference in concentration of one or more factors, growth factors, drugs affecting cell-mediated synthesis, one or more biological perturbations, fetal bovine serum, ROCK-Inhibitor, TGF-β1 inhibitor, an interleukin, a nutrient formulation, electromagnetic radiation, particle bombardment, gravitational force, oxygen and/or gas level, a cytokine, temperature, mechanical conditioning, vibration or motion, pressure or vacuum, time, differences in cell origin(s), gene mutations affecting ECM synthesis, organization, or a test of mechanics relevant to connective tissue diseases.

9. The method of claim 1, further comprising the method is a drug dose response method, wherein the one or more properties of the tissue ECM (experimental) are compared to a tissue ECM cultivated without a presence of the test condition, a native tissue ECM, or a tissue ECM cultivated in vivo (control); and wherein the comparison is operative to provide a drug dose (factor) response including the control and the experimental with a proportional and quantitative signal that is proportional the drug dose response, and wherein the method is executed with at least two different concentrations or doses of the drug or test condition.

10. The method of claim 1, wherein the culture medium is serum-free.

11. The method of claim 1, wherein the well and/or the peg comprises a hydrogel.

12. The method of claim 1, wherein the well and/or the peg comprises a non-adhesive agarose.

13. The method of claim 1, further comprising a proviso that wherein the measuring in step (4) does not contain a noise value and/or a crosstalk value in a signal of the measuring in step (4) because an absence of a scaffolding material and/or an externally applied force during the execution of steps (1), (2), (3), and (4) is configured to provide no cell-scaffold biophysical crosstalk and no cell-external force biophysical crosstalk which would both be present if the method were to be executed with an external force, anchorage force/material or a scaffolding material.

14. The method of claim 1, further comprising wherein the method is configured as a method of investigating a disease or condition due to the further execution of steps (6) and (7) below:
(6) recording the one or more properties of the tissue ECM and/or the cells without contacting with one or more growth factors, tissue dysregulation factors and/or biological agents, and then contacting the tissue ECM and/or the cells with the one or more growth factors, tissue dysregulation factor and/or biological agents;
(7) waiting for a period of time then repeating the recording in step (6) and comparing the one or more properties of the tissue ECM and/or the cells before the contacting in step (6) to the one or more properties of the tissue ECM and/or the cells after the contacting in step (6) after the waiting for the period of time;
whereby the comparing and/or comparison in step (7), after the period of time, is configured to/operative to effect a quantitative change in one or more properties of the tissue ECM and/or the cells and to provide a quantitative measurement by the comparing and/or comparison; and wherein the wherein the quantitative measurement is configured to provide an investigating and/or diagnosing of a disease or condition.

15. The method of claim 1, wherein the method comprises an investigating or a diagnosing of; fibrosis, Marfan Syndrome, Loeys-Dietz syndrome, a deregulated TGF-β signaling, cancer, changes in tissue mechanics, tissue mechanical failure, Ehlers-Danlos syndrome, or Osteogenesis Imperfecta.

16. A quantitative screening method for therapeutic agents or a method for evaluating the efficacy or toxicity of a therapeutic agent candidate substance acting on cells or tissues comprising the method of claim 1; further comprising wherein the method is provided by an execution of steps (6) and (7) below:
(6) recording the one or more properties of the tissue ECM and/or the cells without contacting with one or more therapeutic agents and then contacting the tissue ECM and/or the cells with the one or more therapeutic agents; and
(7) waiting for a period of time then repeating the recording of step (6) and comparing the one or more properties of the tissue ECM and/or the cells before the contacting in step (6) to the one or more properties of the tissue ECM and/or the cells after the contacting in step (6);
whereby the comparing and/or comparison in step (6) after the waiting for the period of time is configured to/operative to effect a quantitative change in one or more properties of the tissue ECM and/or the cells and to provide a quantitative measurement by the comparing and/or comparison.

17. The method of claim 1, further comprising the method is configured as a method of culturing cells, ECM, or tissues, including the method of claim 1, with a proviso that the method can be performed with or without a test condition: wherein the method of culturing cells, ECM, or tissues is configured to provide cells, ECM, or tissues that do not cause a noise value and/or a crosstalk value; and wherein the method further comprising removing the cells, ECM or tissues from the cell culture well and providing the cells, ECM or tissues for a test that is executed at a later time.

18. The method of claim 1, wherein the cells comprise cells from: neonate male foreskin, dermis, tendon, lung, umbilical cords, cartilage, urethra, corneal stroma, oral mucosa, intestine, bone marrow, placenta, amnion, muscle, adipose, bone, human dermal fibroblasts, human umbilical cord perivascular cells, fibroblasts, stromal cells, mesenchymal stem cells, transfected cells, recombinant cells, genetically engineered cells, immune cells, macrophages, or eosinophils.

19. The method of claim 1, wherein the culture medium comprises spheroids including cells or monodispersed cells.

* * * * *